United States Patent
Handshaw et al.

(10) Patent No.: US 11,790,194 B1
(45) Date of Patent: Oct. 17, 2023

(54) HANDHELD BARCODE READERS AND ASSEMBLIES WITH VISION CAMERAS

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Ronald Steven Ethe, Commack, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/710,526

(22) Filed: Mar. 31, 2022

(51) Int. Cl.
*G06K 7/10* (2006.01)
*G06K 7/14* (2006.01)

(52) U.S. Cl.
CPC ..... *G06K 7/10722* (2013.01); *G06K 7/10881* (2013.01); *G06K 7/1413* (2013.01); *G06K 2007/10524* (2013.01)

(58) Field of Classification Search
CPC ................ G06K 7/10881; G06K 2007/10524
USPC .................................................... 235/462.41
See application file for complete search history.

(56) References Cited

U.S. PATENT DOCUMENTS

| | | | |
|---|---|---|---|
| 6,575,368 B1 | 6/2003 | Tamburrini et al. | |
| 2005/0279836 A1 | 12/2005 | Havens et al. | |
| 2010/0019042 A1 | 1/2010 | Barkan et al. | |
| 2011/0290889 A1* | 12/2011 | Tamburrini | G06K 7/109 235/472.01 |
| 2019/0228374 A1* | 7/2019 | Hicks | G06Q 20/204 |
| 2019/0383603 A1 | 12/2019 | Tohme et al. | |
| 2020/0058008 A1* | 2/2020 | Hicks | G06K 7/0004 |
| 2020/0058199 A1 | 2/2020 | Barkan et al. | |
| 2020/0175236 A1 | 6/2020 | Barkan et al. | |
| 2021/0073494 A1 | 3/2021 | Conticello | |

OTHER PUBLICATIONS

International Search Report and Written Opinion for International Application No. PCT/US2023/15724 dated Jun. 22, 2023.

* cited by examiner

*Primary Examiner* — Toan C Ly
(74) *Attorney, Agent, or Firm* — Yuri Astvatsaturov

(57) ABSTRACT

Handheld barcode readers and assemblies are disclosed herein. An example handheld barcode reader includes a housing defining a head portion and a base portion, a vision camera positioned in the base portion, a barcode reading module positioned at least partially in the head portion, and a controller in communication with the barcode reading module and the vision camera. The vision camera has a first FOV directed through a base window in the base portion and the barcode reading module has a second FOV directed through a scan window in the head portion. The controller is configured to decode barcodes read by the barcode reading module, receive captured images from the vision camera, and synchronize the barcode reading module and the vision camera such that the vision camera does not capture images when the barcode reading module is active.

20 Claims, 32 Drawing Sheets

HANDHELD BARCODE READERS AND ASSEMBLIES WITH VISION CAMERAS

BACKGROUND

The use of vision systems having vision cameras at the point of sale, for example in bioptic scanners, is expanding. However, for retail or other environments that use handheld barcode readers or slot scanners, there currently are no good solutions that use vision systems at the point of sale. Therefore, there is a need for a handheld barcode reader and/or handheld barcode reader assembly that includes a vision camera to monitor a checkout area for typical loss prevention issues, such as sweethearting, ticket switching, scan avoidance, etc.

SUMMARY

In an embodiment, the present invention is a handheld barcode reader comprising a housing defining a head portion and a base portion, a vision camera positioned in the base portion, a barcode reading module positioned at least partially in the head portion, and a controller in communication with the barcode reading module and the vision camera. The vision camera has a first field-of-view (FOV) directed through a base window in the base portion and the barcode reading module having a second FOV directed through a scan window in the head portion. The controller is configured to decode barcodes read by the barcode reading module, receive captured images from the vision camera, and synchronize the barcode reading module and the vision camera such that the vision camera does not capture images when the barcode reading module is active.

In a variation of this embodiment, the base portion comprises an upper portion and two switchable, field upgradable lower portions removably attachable to the upper portion. A first lower portion of the two switchable, field upgradable lower portions includes the vision camera and a second lower portion of the two switchable, field upgradable lower portions does not include the vision camera.

In another embodiment, the present invention is a handheld barcode reader comprising a housing defining a head portion and a base portion, a vision camera positioned at least partially in the head portion, a barcode reading module positioned at least partially in the head portion, and a controller in communication with the barcode reading module and the vision camera. The vision camera has a first FOV and the barcode reading module has a second FOV directed through a scan window in the head portion. The controller is configured to decode barcodes read by the barcode reading module, receive captured images from the vision camera, and synchronize the barcode reading module and the vision camera such that the vision camera does not capture images when the barcode reading module is active.

In a variation of this embodiment, the head portion comprises two switchable, field upgradable portions. A first portion of the two switchable, field upgradable portions comprises the vision camera, the first FOV of the vision camera being directed through a front window formed in the head portion, and a second portion of the two switchable, field upgradable portions does not include the vision camera.

In another embodiment, the present invention is a base to receive and support a handheld barcode reader. The base comprises a base housing and a vision camera positioned within the base housing. The base housing comprises a cradle section configured to receive the handheld barcode reader and the vision camera has a first FOV directed through a base window in the base housing.

In a variation of this embodiment, a handheld barcode reader assembly comprises the base and a handheld barcode reader.

In another variation of this embodiment, the base housing comprises an upper portion and two switchable, field upgradable bottom portions, each removably attachable to the upper portion. A first bottom portion of the two switchable, field upgradable bottom portions comprises the vision camera and a second bottom portion of the two switchable, field upgradable bottom portions does not include the vision camera.

In another embodiment, the present invention is a cradle to receive and support a handheld barcode reader. The cradle comprises a cradle portion configured to receive the handheld barcode reader, a base portion connected to the cradle portion via an arm, and a vision camera positioned in the cradle portion of the base portion.

In a variation of this embodiment, a handheld barcode reader assembly comprises the cradle and a handheld barcode reader.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
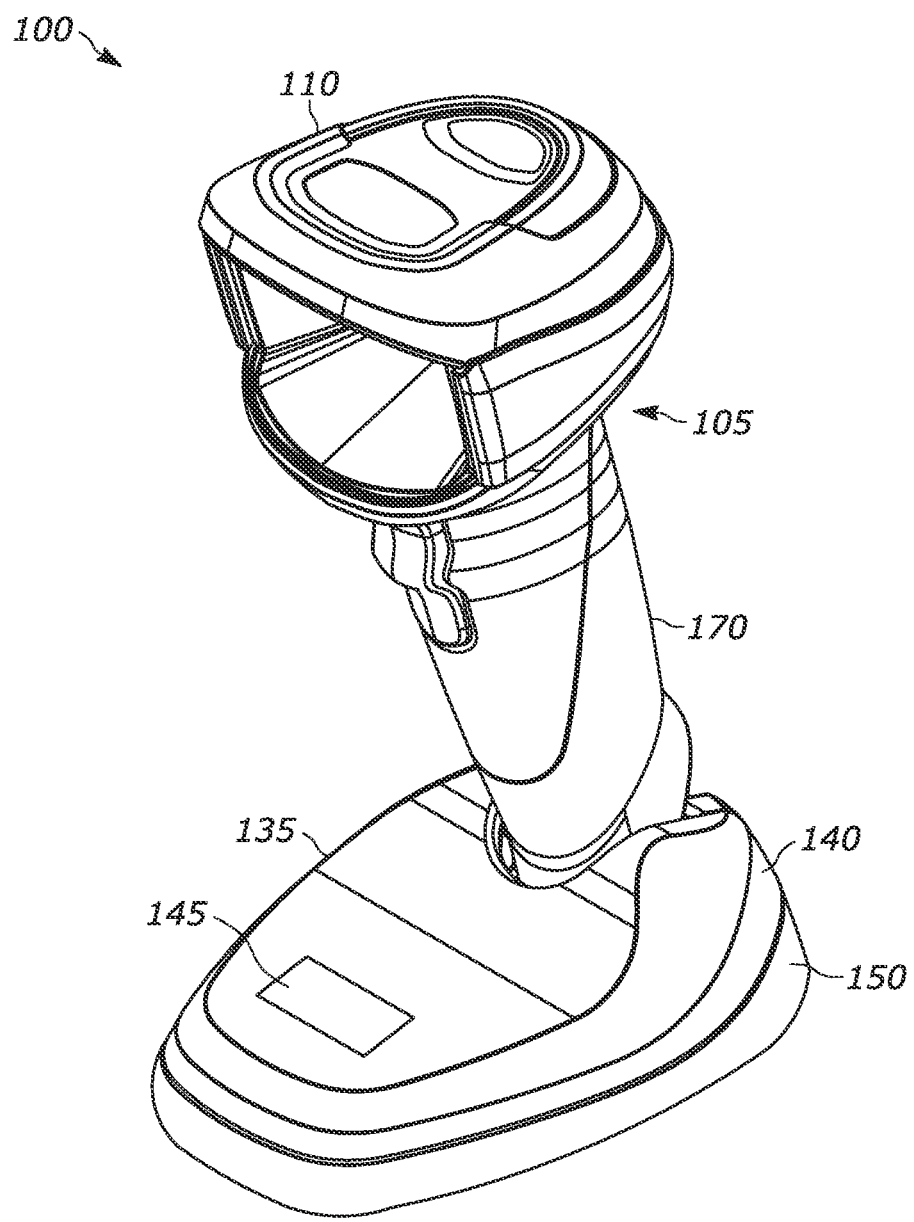
FIG. 1 illustrates a perspective view of a first example handheld barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example handheld barcode readers and handheld barcode reader assemblies disclosed herein include a vision camera, in addition to a barcode reading module, that can be used to address typical loss prevention issues, such as sweethearting, ticket switching, scan avoidance, etc. The vision camera can be placed in the base portion of a handheld barcode reader, in a base that receives and supports a handheld barcode reader, or in an adapter that can be attached to a handheld barcode reader or a base that receives and supports a handheld barcode reader.

When used in a retail environment, the vision camera can be configured to view a large portion of the checkout area, including the entire space around the counter and a standing or seated users face, in order to monitor for loss prevention and other applications, such as facial recognition, etc. These handheld barcode readers and handheld barcode reader assemblies can also be useful in other environments, such as in the healthcare field. For example, the handheld barcode readers and handheld barcode reader assemblies can be placed on a check-in desk or mounted to a wheeled cart, such as those typically used in medical facilities, and the vision cameras can be used to take photos of a patient during initial registration or can be used with facial recognition as a secondary means of verification during administration of medication.

The vision camera can be used to determine whether or not a handheld barcode reader is seated in a base or cradle (e.g., to automatically switch from a hands fee mode of operation to a handheld mode of operation). The vision camera can also be used detect if a user leaves the field-of-view of the vision camera and the handheld barcode reader is not returned to the base or cradle. This can trigger an alert that either the handheld barcode reader needs to be charged or may have been stolen or misplaced. The vision camera can also be used to detect if a face of a user is within a FOV and, if a face is detected, the controller can dim the illumination of the barcode reading module to prevent eye annoyance while the handheld barcode scanner is in a hands-free operational mode.

With a vision camera having a wide field-of-view (e.g., 100 degrees), the handheld barcode reader or handheld barcode reader assembly could potentially be positioned such that the vision camera can see both the customer and the cashier standing to either side of the counter. In this case, specific interactions between both customer and cashier could be monitored, such as when the customer hands cash over cash, credit card, or coupons to a cashier, and receives them back, or when a cashier hands the customer a receipt. Alerts could be triggered, for example, if the cashier forgets to hand the credit card back to the user or if the cashier forgets to give the receipt to the customer.

The vision camera can also be mounted within the handheld barcode reader or the base on an adjustable arm, in a ball joint or gimbal, or on a positionable bracket so that the vision camera can be aimed to best cover the checkout area layout specific to a particular environment. Different environments may require different orientations of the handheld barcode reader or base. In some applications, the vision camera may be aimed at the customer when in hands-free mode or at the cashier. In other applications, the handheld barcode reader or handheld barcode reader assembly can be positioned sideways between the cashier and customer. With adjustability, the vision camera can be aimed differently, depending on how the handheld barcode reader or handheld barcode reader assembly is sitting. The vision camera could also be tilted higher or lower in cases where the handheld barcode reader or handheld barcode reader assembly is mounted on a cart on wheels to better take pictures of the patient. The mechanism could also be locked into the desired position, so it is not easily changed.

Figure 2:
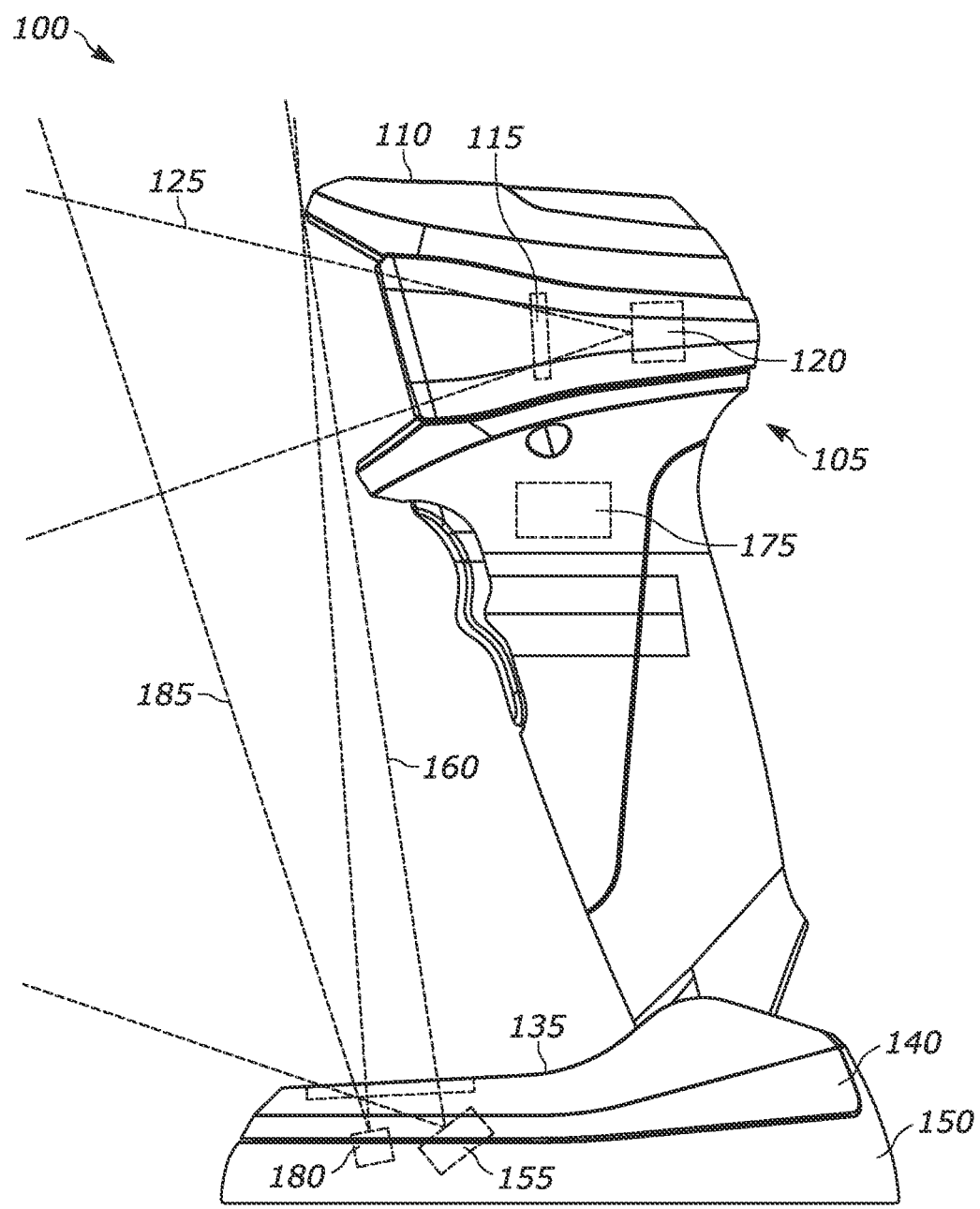
FIG. 2 illustrates a side view of the handheld barcode reader of FIG. 1.
Figure 3:
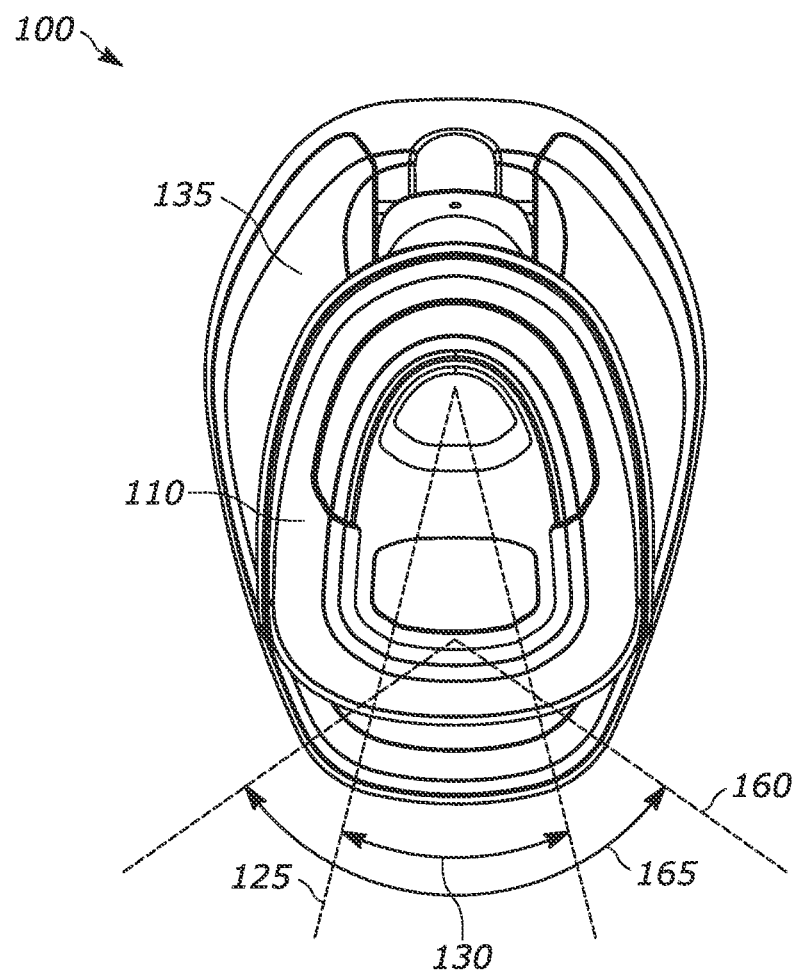
FIG. 3 illustrates a top view of the handheld barcode reader of FIG. 1.

Referring to FIGS. 1-3, a first example handheld barcode reader 100 is illustrated. Handheld barcode reader 100 generally includes a housing 105 having a head portion 110 and a base portion 135. Base portion 135 includes an upper portion 140, a lower portion 150 removably attached to upper portion 140, and a base window 145 formed in upper portion 140. While lower portion 150 is shown as being separable from upper portion 140 in a horizontal direction, the separation between lower portion 150 and upper portion 140 could be vertical or in any other direction appropriate for a particular application. In the particular example shown, housing 105 also has a handle portion 170 positioned between head portion 110 and base portion 135 and configured to be grasped by the hand of a user.

A vision camera 155 is positioned within base portion 135 and has a first field-of-view (FOV) 160 that is directed out of base window 145 in upper portion 140 of base portion 135. Preferably, an area adjacent a front of handle portion 170 (e.g., within 10 mm of the front of handle portion 170 or within a finger's width of the front of handle portion 170) is visible in first FOV 160, which can be used to determine if a user is gripping handle portion and possibly switch handheld barcode reader 100 between a hands-free presentation mode and a handheld scanning mode based on vision camera 155 detecting the presence or absence of the hand of the user within first FOV 160. In the example shown, vision camera 155 is configured to capture images to perform functions such as facial recognition, gesture recognition, product identification, scan avoidance, ticket switching, etc., and is not configured to capture images for decoding barcodes.

A barcode reading module 120 is positioned at least partially in head portion 110 and has a second FOV 125 that is directed through a scan window 115 in head portion 110 and can at least partially overlap first FOV 160.

A controller 175 is also positioned within housing 105 and is in communication with barcode reading module 120 and vision camera 155. Controller 175 is configured to decode process signals from barcode reading module 120 from barcodes that are read by barcode reading module 120 and to receive and process images captured by and received from vision camera 155 for processes that do not include barcode reading, as discussed above. Controller 175 is also configured to synchronize barcode reading module 120 and vision camera 155 so that vision camera 155 does not capture images when barcode reading module 120 is active. Controller 175 can synchronize barcode reading module 120 and vision camera 155 based on images captured by vision camera 155 or handheld barcode reader 100 could have an optical sensor 180 that is positioned in base portion 135, is in communication with controller 175, and has a third FOV 185 that at least partially overlaps second FOV 125 of barcode reading module 120 to determine when barcode reading module 120 is active. Controller 175 can then be configured to receive signals from optical sensor 180 indicating whether or not barcode reading module 120 is active and synchronize vision camera 155 and barcode reading module 120 (e.g., by not capturing images from vision camera 155 while barcode reading module 120 is active) based on the signals received from optical sensor 180. Alternatively, controller 175 could be configured to synchronize vision camera 155 and barcode reading module 120 to activate simultaneously so that vision camera 155 can use the same illumination as barcode reading module 120.

As best shown in FIG. 3, first FOV 160 of vision camera 155 has a horizontal viewing angle 165 that is larger than the horizontal viewing angle 130 of second FOV 125 of barcode reading module 120. For example, horizontal viewing angle 165 of first FOV 160 could be between 80 degrees and 120 degrees and is preferably 100 degrees. In addition, horizontal viewing angle 130 of second FOV 125 could be between 40 degrees and 60 degrees. With horizontal viewing angle 165 of first FOV 160 of vision camera 155 being wider than horizontal viewing angle 130 of second FOV 125 of barcode reading module 120, vision camera 155 can be used as a wake-up system and controller 175 can be configured to turn on barcode reading module 120 when an object is detected in first FOV 160 of vision camera 155, before the object reaches second FOV 125 of barcode reading module 120. This allows barcode reading module 120 to be active as the object enters second FOV 125 and allows more time for barcode reading module 120 to read and decode a barcode on the object.

Figure 4:
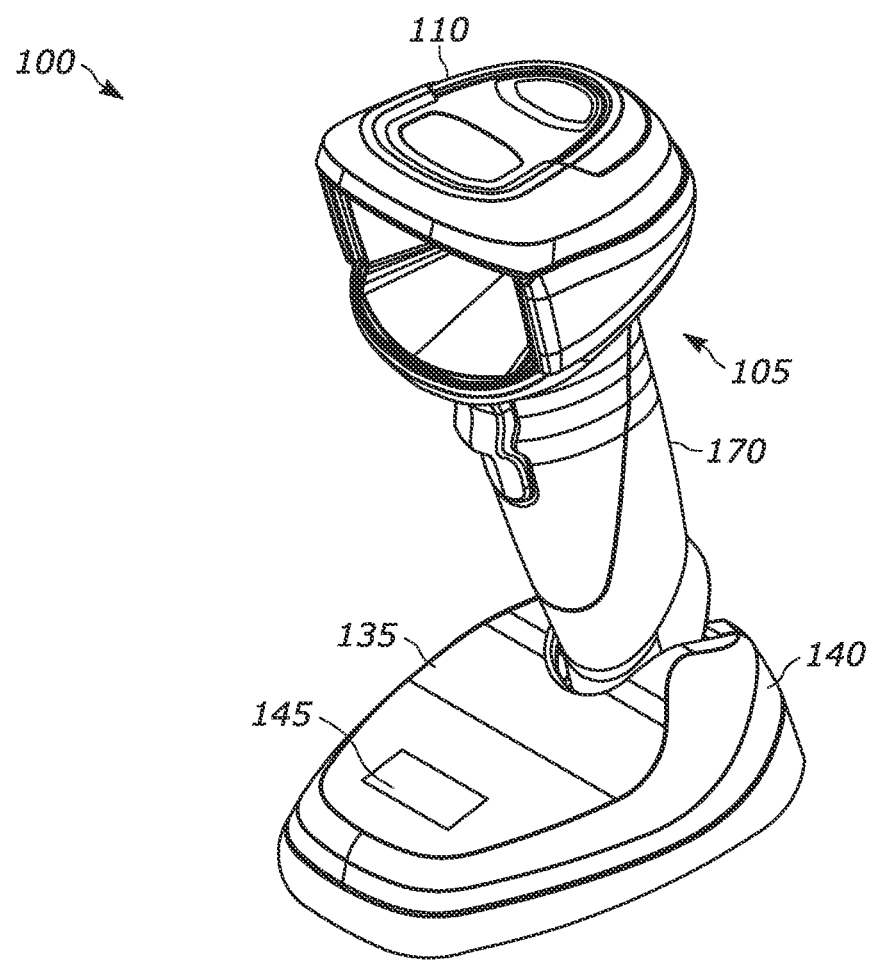
FIG. 4 illustrates a perspective view of the handheld barcode reader of FIG. 1 with two interchangeable, field-upgradable lower portions.
Figure 4:
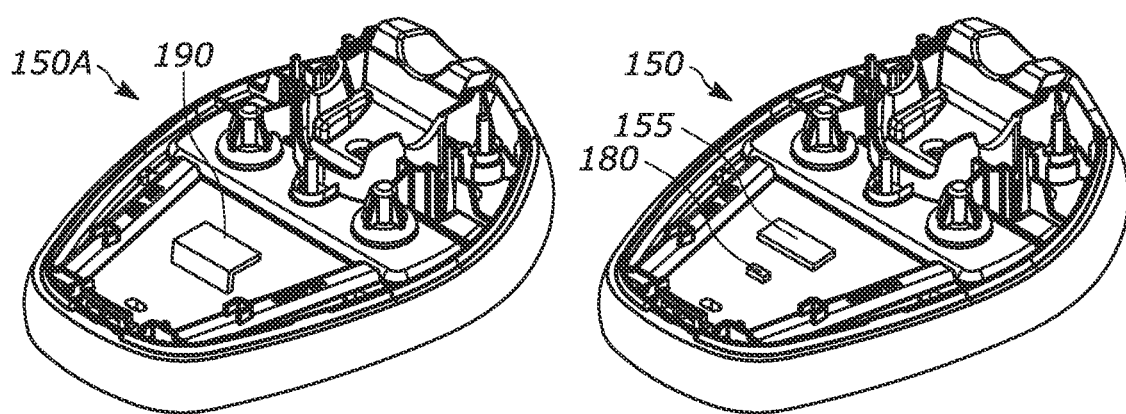

Handheld barcode reader 100 can also have two switchable, field upgradeable lower portions so that handheld barcode reader 100 can be can be configured to have vision camera 155 or not have vision camera 155. For example, referring to FIG. 4, base portion 135 of handheld barcode reader 100 can have lower portion 150, as described above, which includes vision camera 155 (and optical sensor 180 if used) and can have a switchable, field upgradeable second lower portion 150A that is also removably attachable to upper portion 140 of base portion 135 and does not include vision camera 155 or optical sensor 180. Since second lower portion 150A does not have vision camera 155, second lower portion 150A could have an extension 190 that extends from second lower portion 150A and is configured to block base window 145 in upper portion 140. Alternatively, rather than extension 190, base window 145 could be covered or blocked by a label, a plug, a plate, etc. when second lower portion 150A is used.

Figure 5:
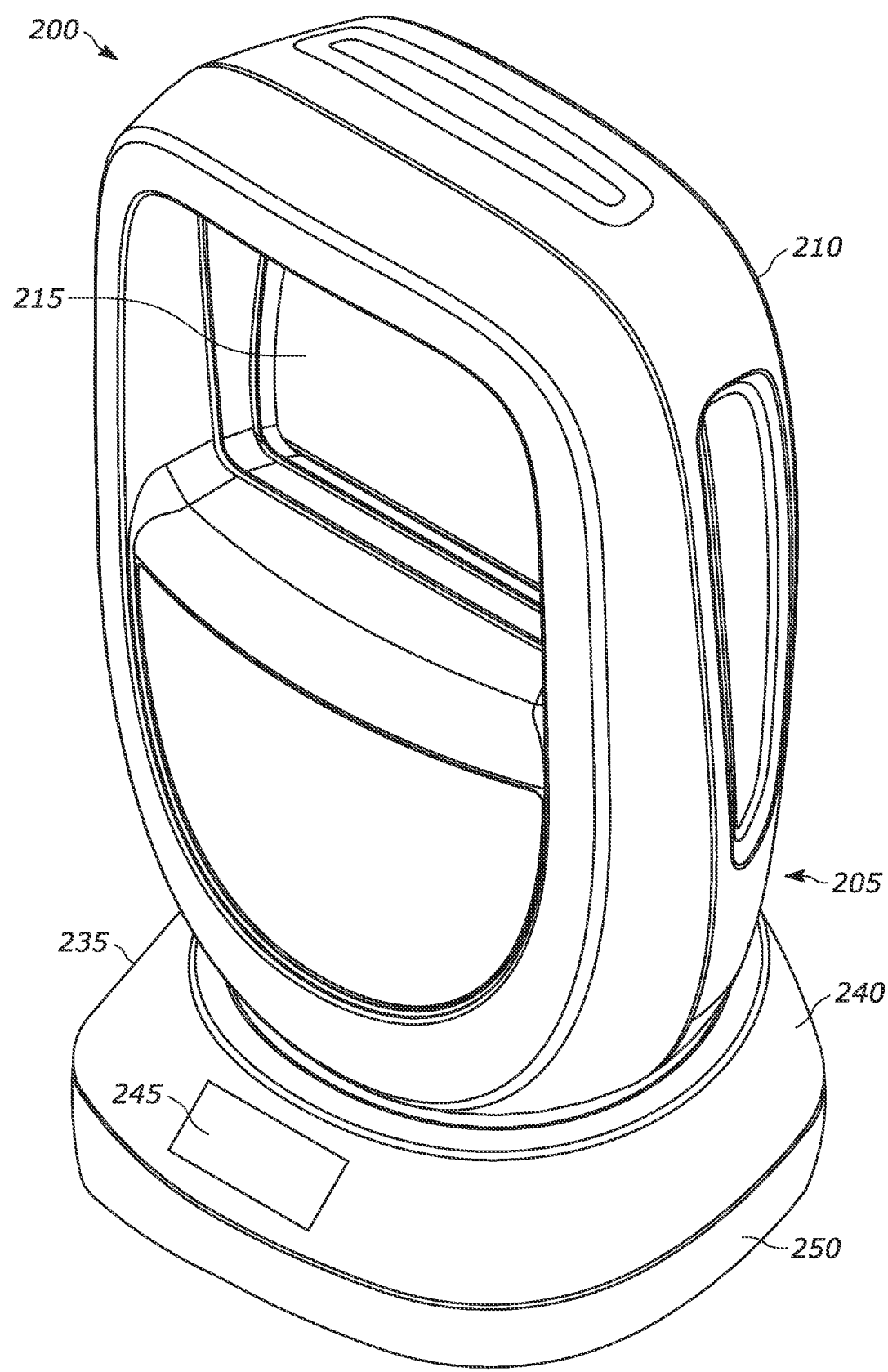
FIG. 5 illustrates a perspective view of a second example handheld barcode reader.
Figure 6:
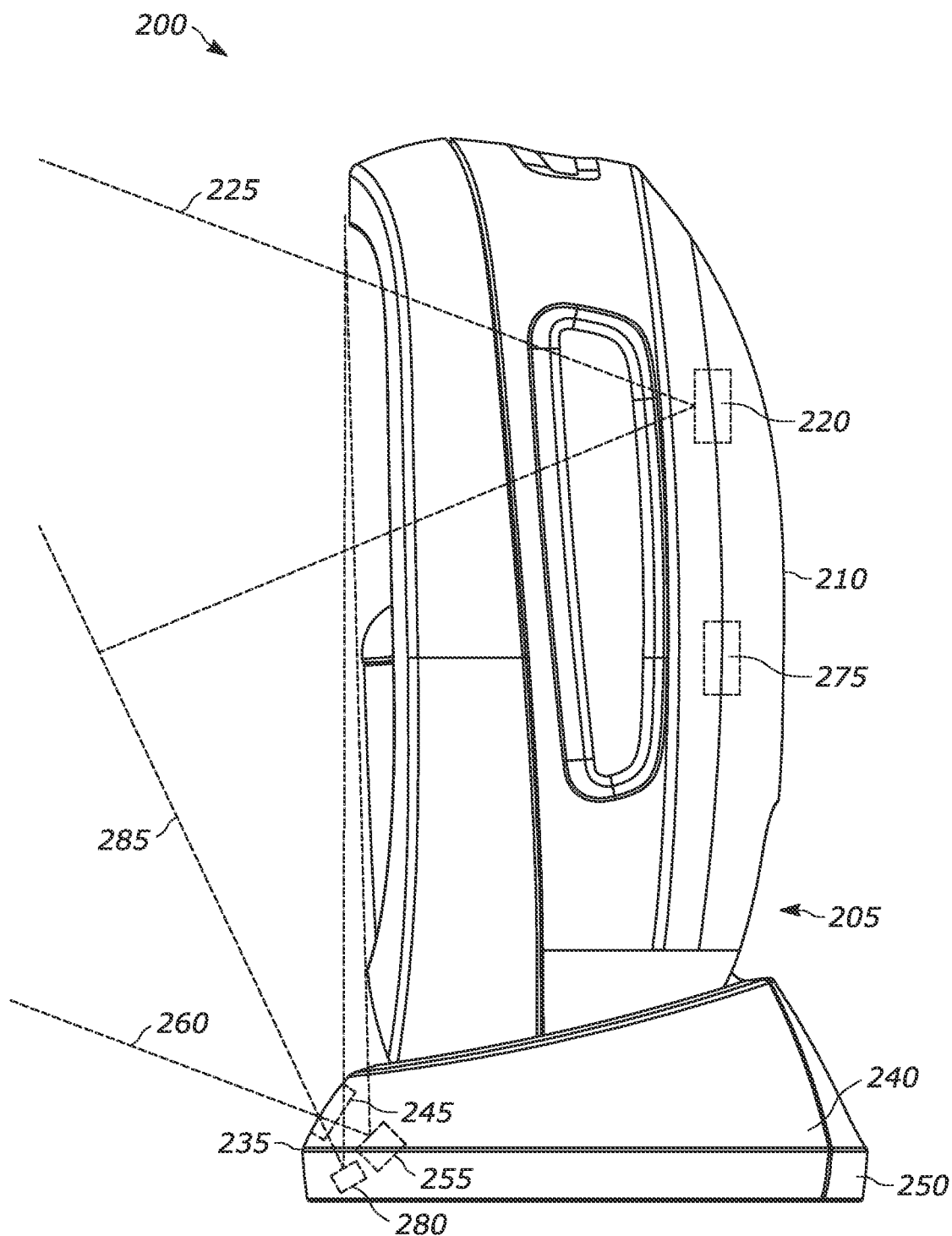
FIG. 6 illustrates a side view of the handheld barcode reader of FIG. 5.
Figure 7:
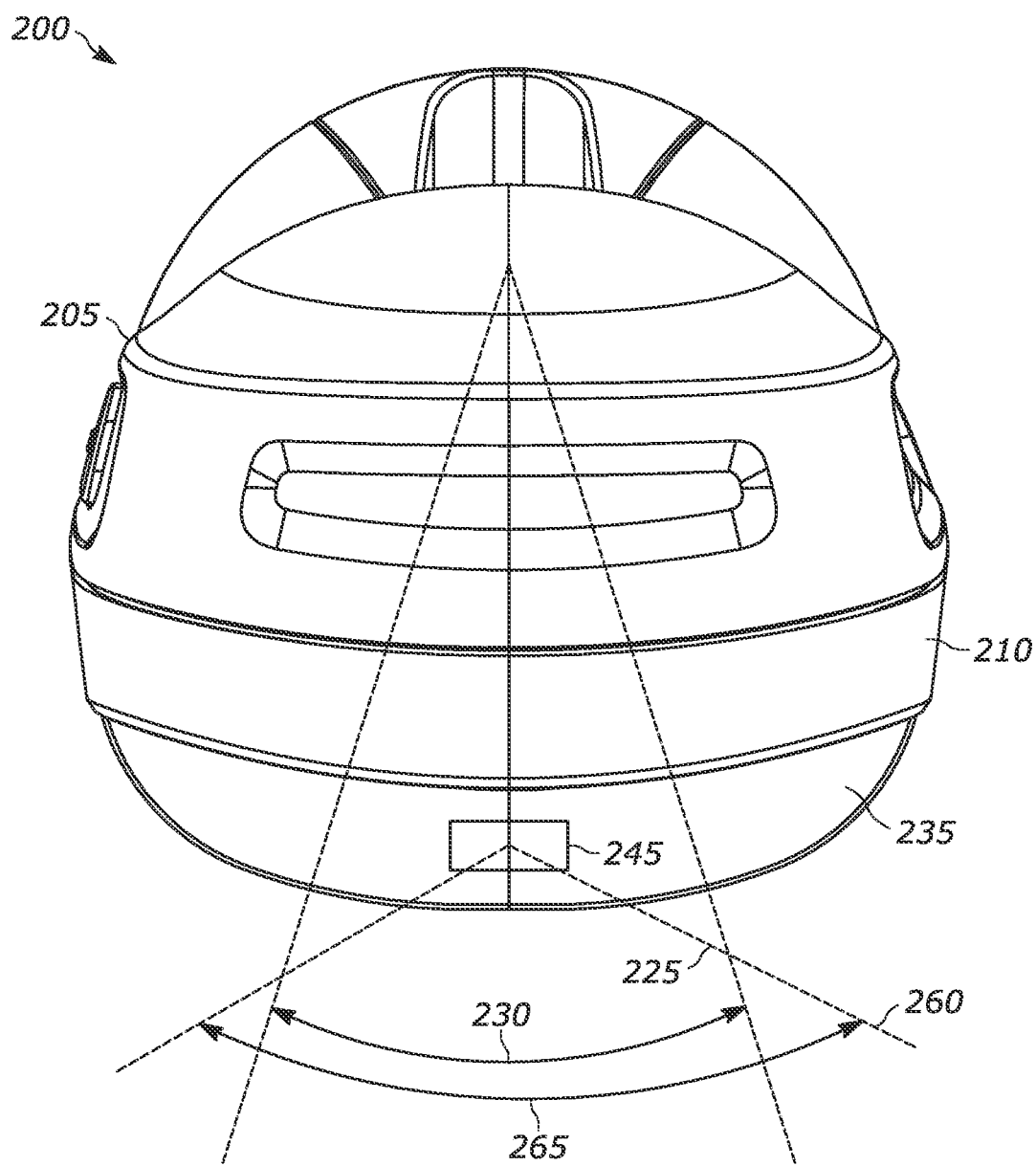
FIG. 7 illustrates a top view of the handheld barcode reader of FIG. 5.

Referring to FIGS. 5-7, a second example handheld barcode reader 200 is illustrated. Handheld barcode reader 200 generally includes a housing 205 having a head portion 210 and a base portion 235. Base portion 235 includes an upper portion 240, a lower portion 250 removably attached to upper portion 240, and a base window 245 formed in upper portion 240. While lower portion 250 is shown as being separable from upper portion 240 in a horizontal direction, the separation between lower portion 250 and upper portion 240 could be vertical or in any other direction appropriate for a particular application.

A vision camera 255 is positioned within base portion 235 and has a first field-of-view (FOV) 260 that is directed out of base window 245 in upper portion 240 of base portion 235. In the example shown, vision camera 255 is configured to capture images to perform functions such as facial recognition, gesture recognition, product identification, scan avoidance, ticket switching, etc., and is not configured to capture images for decoding barcodes.

A barcode reading module 220 is positioned at least partially in head portion 210 and has a second FOV 225 that is directed through a scan window 215 in head portion 210 and can at least partially overlap first FOV 260.

A controller 275 is also positioned within housing 205 and is in communication with barcode reading module 220 and vision camera 255. Controller 275 is configured to decode process signals from barcode reading module 220 from barcodes that are read by barcode reading module 220 and to receive and process images captured by and received from vision camera 255 for processes that do not include barcode reading, as discussed above. Controller 275 is also configured to synchronize barcode reading module 220 and vision camera 255 so that vision camera 255 does not capture images when barcode reading module 220 is active. Controller 275 can synchronize barcode reading module 220 and vision camera 255 based on images captured by vision camera 255 or handheld barcode reader 200 could have an optical sensor 280 that is positioned in base portion 235, is in communication with controller 275, and has a third FOV 285 that at least partially overlaps second FOV 225 of barcode reading module 220 to determine when barcode reading module 220 is active. Controller 275 can then be configured to receive signals from optical sensor 280 indicating whether or not barcode reading module 220 is active and synchronize vision camera 255 and barcode reading module 220 (e.g., by not capturing images from vision camera 255 while barcode reading module 220 is active) based on the signals received from optical sensor 280. Alternatively, controller 275 could be configured to synchronize vision camera 255 and barcode reading module 220 to activate simultaneously so that vision camera 255 can use the same illumination as barcode reading module 220.

As best shown in FIG. 7, first FOV 260 of vision camera 255 has a horizontal viewing angle 265 that is larger than the horizontal viewing angle 230 of second FOV 225 of barcode reading module 220. For example, horizontal viewing angle 265 of first FOV 260 could be between 80 degrees and 120 degrees and is preferably 100 degrees. In addition, horizontal viewing angle 230 of second FOV 225 could be between 40 degrees and 60 degrees. With horizontal viewing angle 265 of first FOV 260 of vision camera 255 being wider than horizontal viewing angle 230 of second FOV 225 of barcode reading module 220, vision camera 255 can be used as a wake-up system and controller 275 can be configured to turn on barcode reading module 220 when an object is detected in first FOV 260 of vision camera 255, before the object reaches second FOV 225 of barcode reading module 220. This allows barcode reading module 220 to be active as the object enters second FOV 225 and allows more time for barcode reading module 220 to read and decode a barcode on the object.

Figure 8:
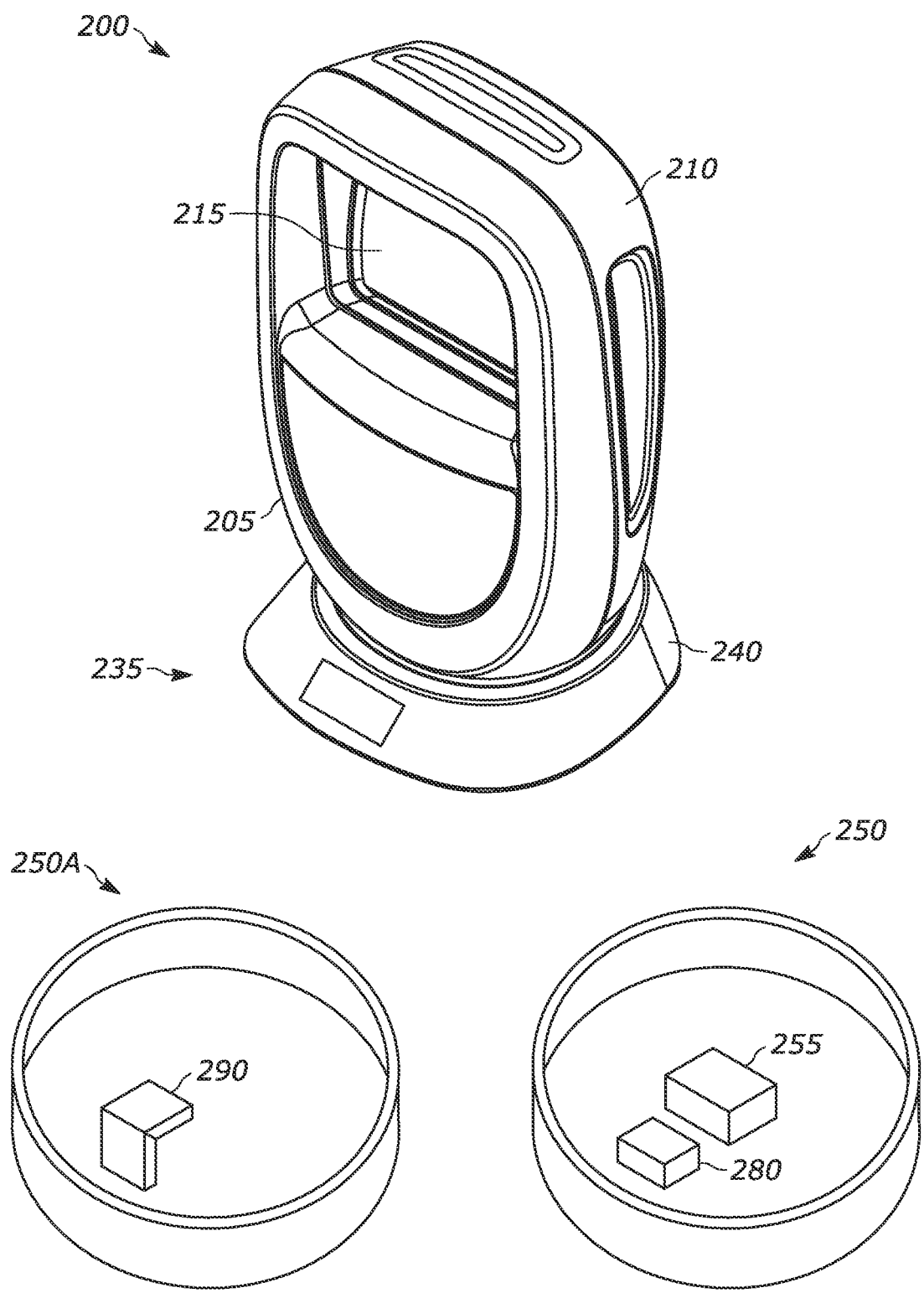
FIG. 8 illustrates a perspective view of the handheld barcode reader of FIG. 5 with two interchangeable, field-upgradable lower portions.

Handheld barcode reader 200 can also have two switchable, field upgradeable lower portions so that handheld barcode reader 200 can be can be configured to have vision camera 255 or not have vision camera 255. For example, referring to FIG. 8, base portion 235 of handheld barcode reader 200 can have lower portion 250, as described above, which includes vision camera 255 (and optical sensor 280 if used) and can have a switchable, field upgradeable second lower portion 250A that is also removably attachable to upper portion 240 of base portion 235 and does not include vision camera 255 or optical sensor 280. Since second lower portion 250A does not have vision camera 255, second lower portion 250A could have an extension 290 that extends from second lower portion 250A and is configured to block base window 245 in upper portion 240. Alternatively, rather than extension 290, base window 245 could be covered or blocked by a label, a plug, a plate, etc. when second lower portion 250A is used.

Figure 9:
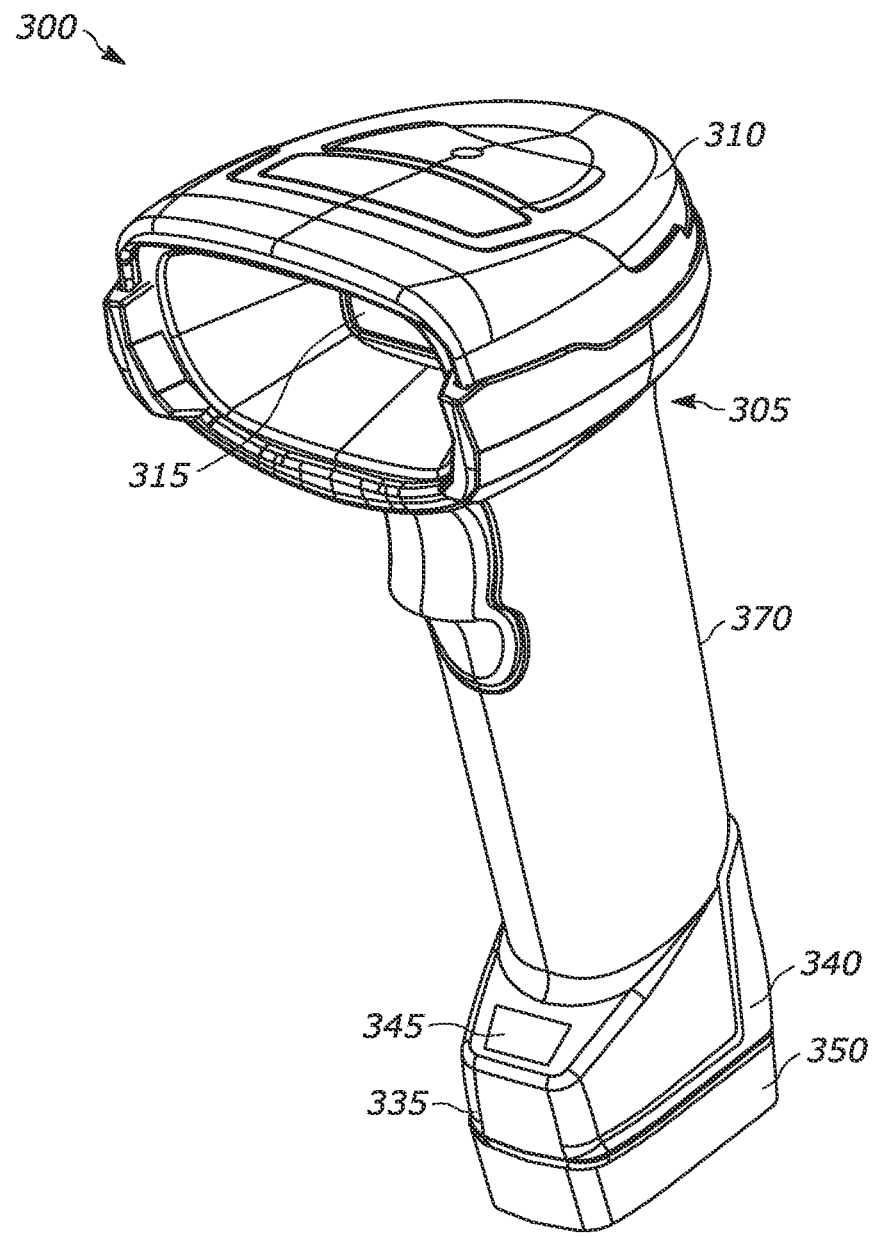
FIG. 9 illustrates a perspective view of a third example handheld barcode reader.
Figure 10:
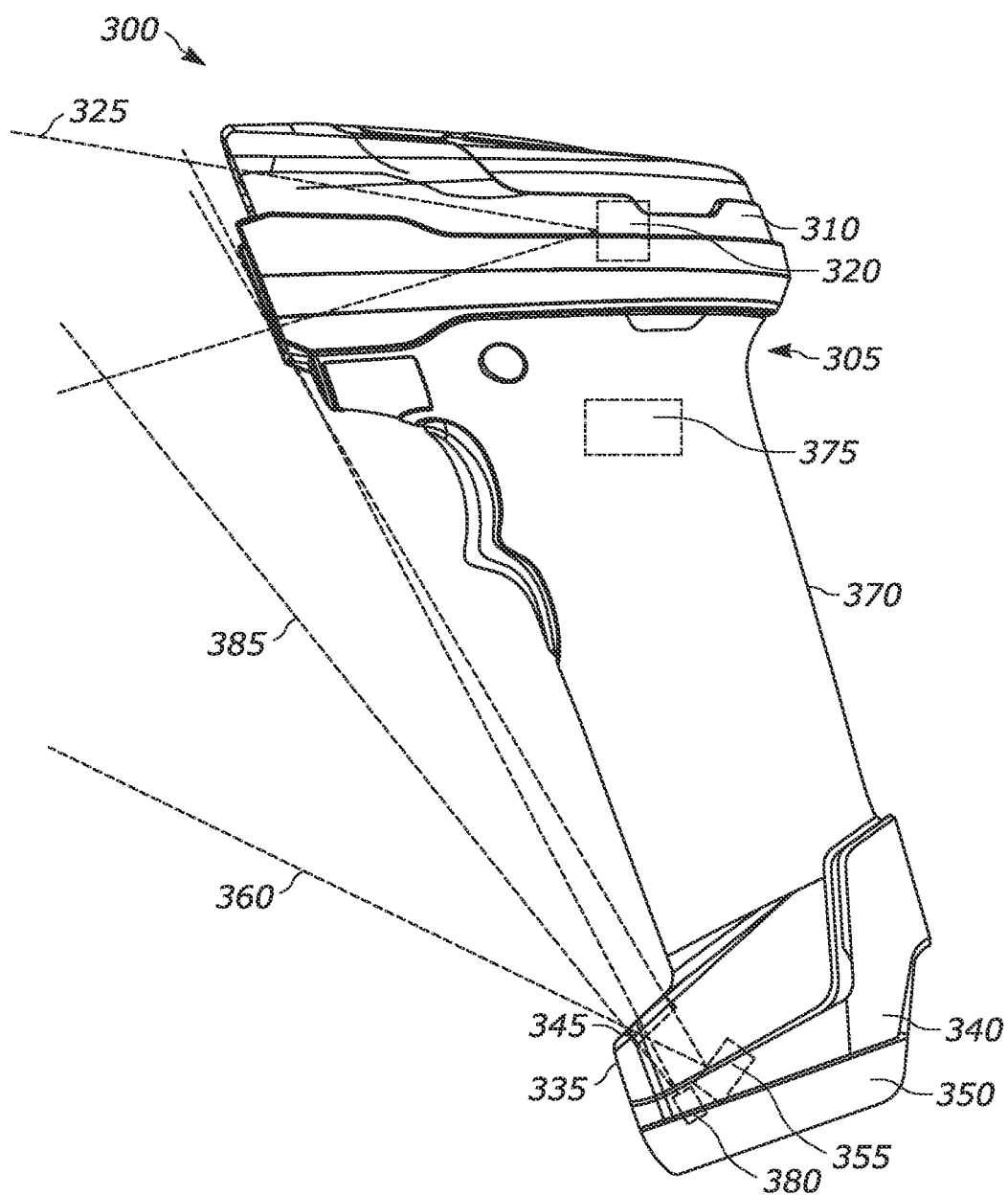
FIG. 10 illustrates a side view of the handheld barcode reader of FIG. 9.
Figure 11:
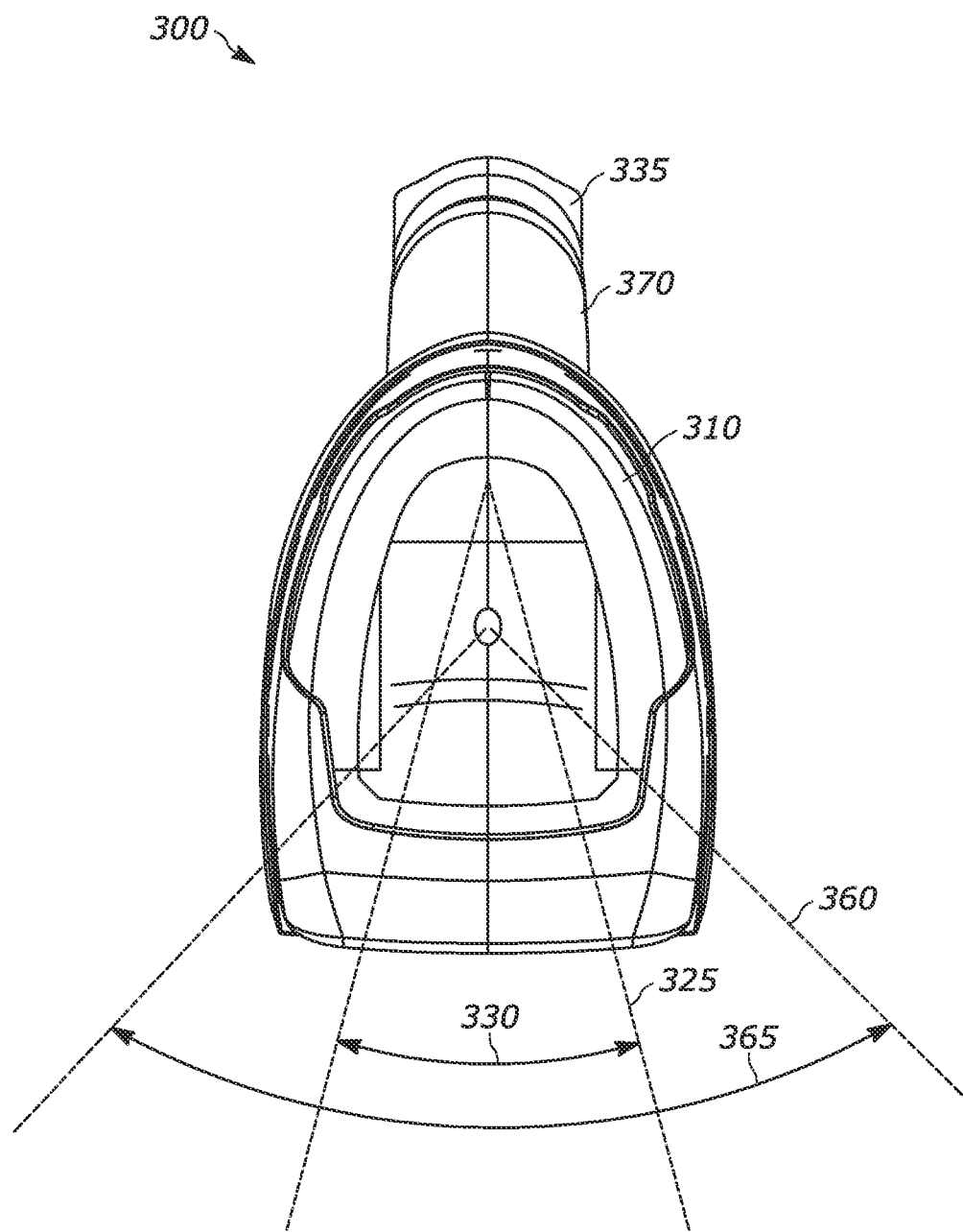
FIG. 11 illustrates a top view of the handheld barcode reader of FIG. 9.

Referring to FIGS. 9-11, a third example handheld barcode reader 300 is illustrated. Handheld barcode reader 300 generally includes a housing 305 having a head portion 310 and a base portion 335. Base portion 335 includes an upper portion 340, a lower portion 350 removably attached to upper portion 340, and a base window 345 formed in upper portion 340. While lower portion 350 is shown as being separable from upper portion 340 in a horizontal direction, the separation between lower portion 350 and upper portion 340 could be vertical or in any other direction appropriate for a particular application. In the particular example shown, housing 305 also has a handle portion 370 positioned between head portion 310 and base portion 335 and configured to be grasped by the hand of a user.

A vision camera 355 is positioned within base portion 335 and has a first field-of-view (FOV) 360 that is directed out of base window 345 in upper portion 340 of base portion 335. Preferably, an area adjacent a front of handle portion 370 (e.g., within 10 mm of the front of handle portion 370 or within a finger's width of the front of handle portion 370) is visible in first FOV 360, which can be used to determine if a user is gripping handle portion and possibly switch handheld barcode reader 300 between a hands-free presentation mode and a handheld scanning mode based on vision camera 355 detecting the presence or absence of the hand of the user within first FOV 360. In the example shown, vision camera 355 is configured to capture images to perform functions such as facial recognition, gesture recognition, product identification, scan avoidance, ticket switching, etc., and is not configured to capture images for decoding barcodes.

A barcode reading module 320 is positioned at least partially in head portion 310 and has a second FOV 325 that is directed through a scan window 315 in head portion 310 and can at least partially overlap first FOV 360.

A controller 375 is also positioned within housing 305 and is in communication with barcode reading module 320 and vision camera 355. Controller 375 is configured to decode process signals from barcode reading module 320 from barcodes that are read by barcode reading module 320 and to receive and process images captured by and received from vision camera 355 for processes that do not include barcode reading, as discussed above. Controller 375 is also configured to synchronize barcode reading module 320 and vision camera 355 so that vision camera 355 does not capture images when barcode reading module 320 is active. Controller 375 can synchronize barcode reading module 320 and vision camera 355 based on images captured by vision camera 355 or handheld barcode reader 300 could have an optical sensor 380 that is positioned in base portion 335, is in communication with controller 375, and has a third FOV 385 that at least partially overlaps second FOV 325 of barcode reading module 320 to determine when barcode reading module 320 is active. Controller 375 can then be configured to receive signals from optical sensor 380 indicating whether or not barcode reading module 320 is active and synchronize vision camera 355 and barcode reading module 320 (e.g., by not capturing images from vision camera 355 while barcode reading module 320 is active) based on the signals received from optical sensor 380. Alternatively, controller 375 could be configured to synchronize vision camera 355 and barcode reading module 320 to activate simultaneously so that vision camera 355 can use the same illumination as barcode reading module 320.

As best shown in FIG. 11, first FOV 360 of vision camera 355 has a horizontal viewing angle 365 that is larger than the horizontal viewing angle 330 of second FOV 325 of barcode reading module 320. For example, horizontal viewing angle 365 of first FOV 360 could be between 80 degrees and 120 degrees and is preferably 100 degrees. In addition, horizontal viewing angle 330 of second FOV 325 could be between 40 degrees and 60 degrees. With horizontal viewing angle 365 of first FOV 360 of vision camera 355 being wider than horizontal viewing angle 330 of second FOV 325 of barcode reading module 320, vision camera 355 can be used as a wake-up system and controller 375 can be configured to turn on barcode reading module 320 when an object is detected in first FOV 360 of vision camera 355, before the object reaches second FOV 325 of barcode reading module 320. This allows barcode reading module 320 to be active as the object enters second FOV 325 and allows more time for barcode reading module 320 to read and decode a barcode on the object.

Figure 12:
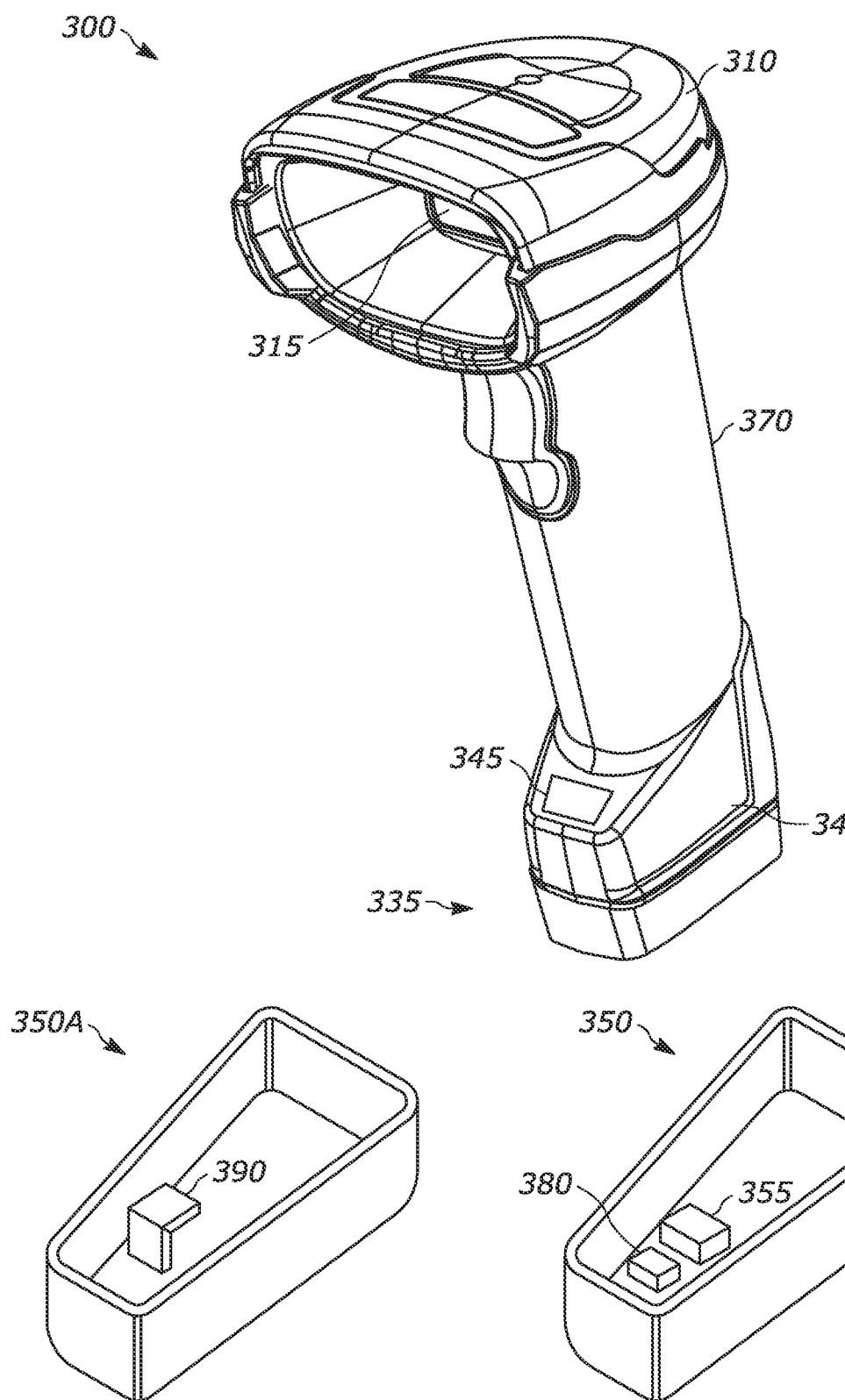
FIG. 12 illustrates a perspective view of the handheld barcode reader of FIG. 9 with two interchangeable, field-upgradable lower portions.
Figure 13:
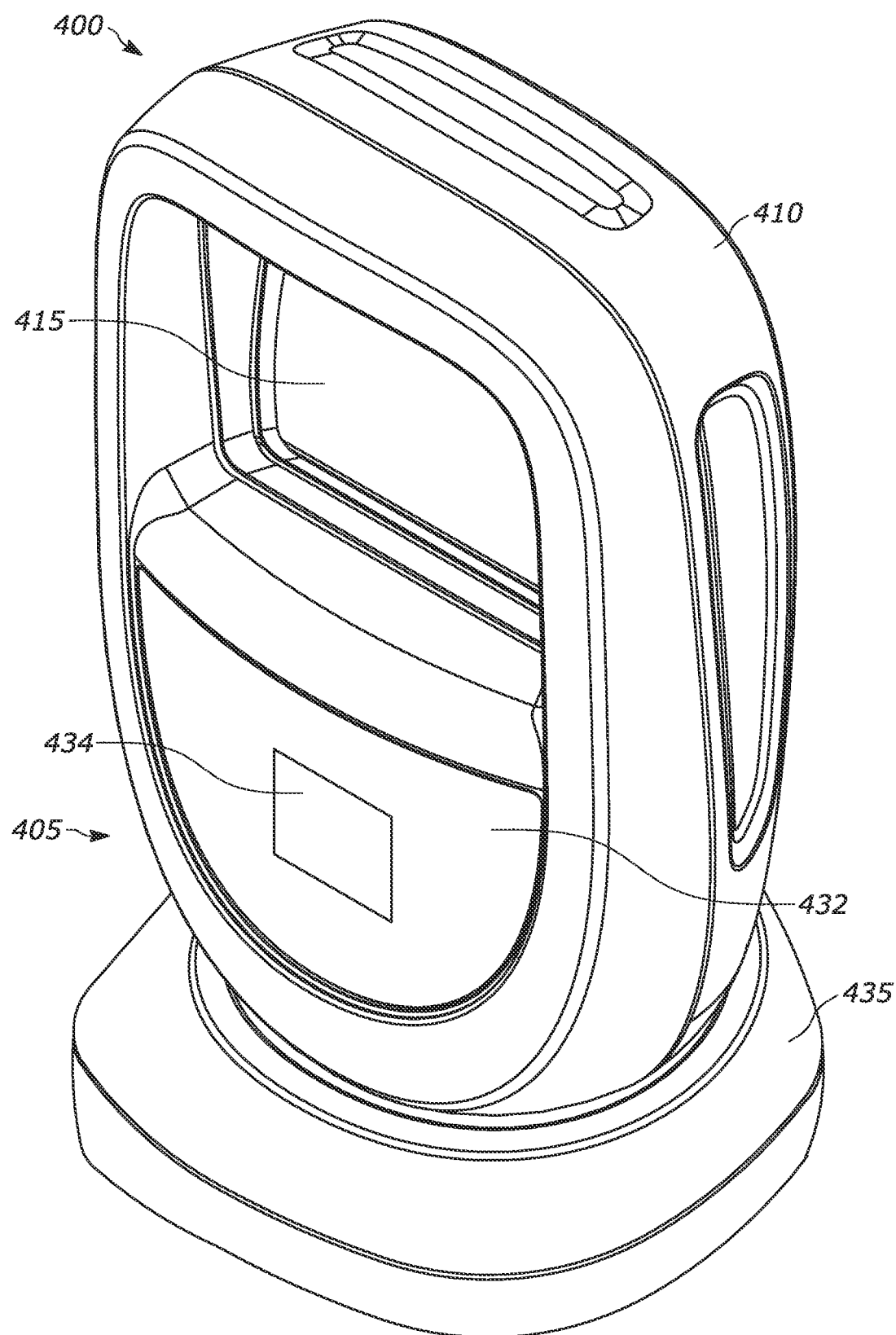
FIG. 13 illustrates a perspective view of a fourth example handheld barcode reader.
Figure 14:
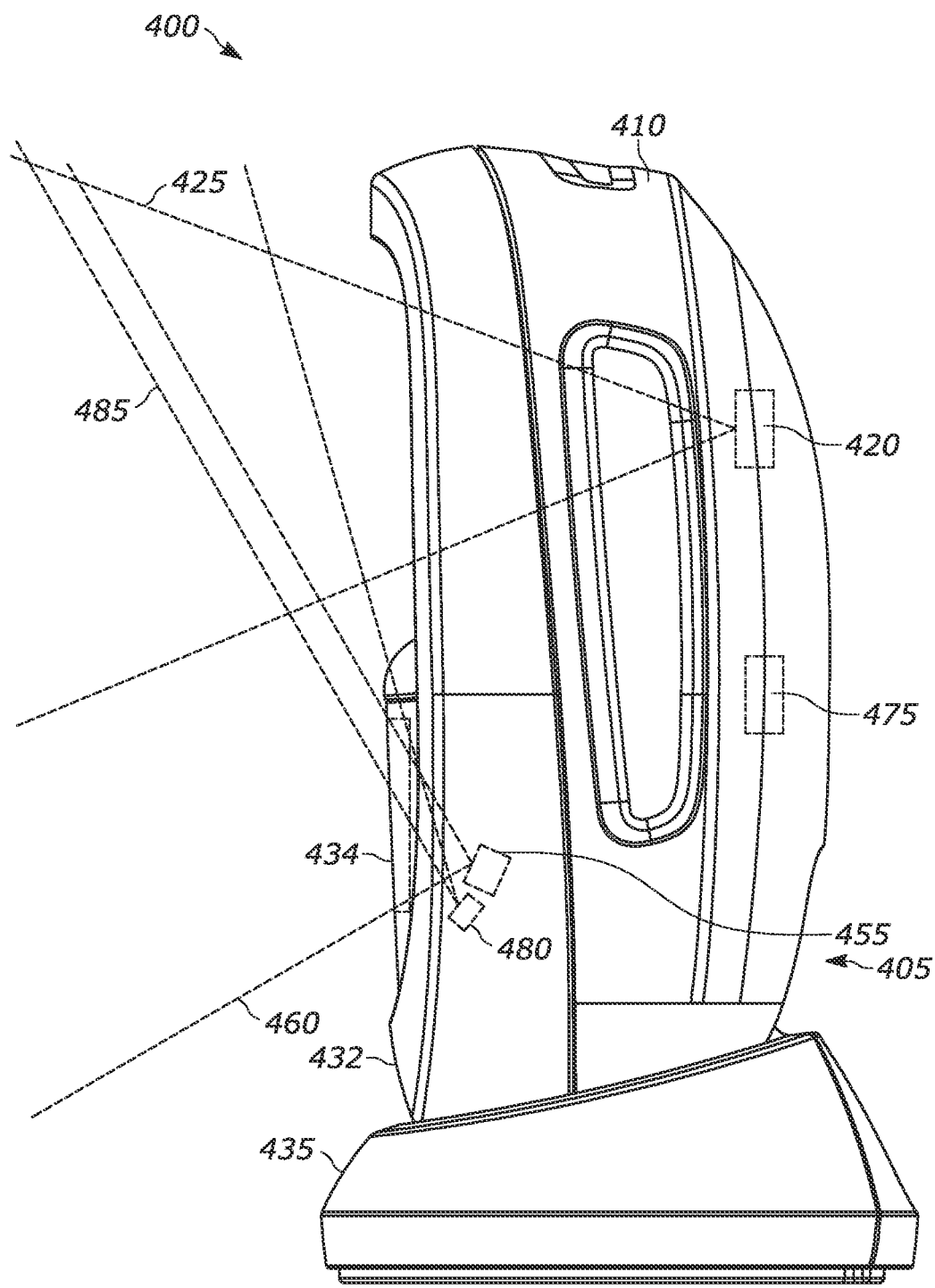
FIG. 14 illustrates a side view of the handheld barcode reader of FIG. 13.

Handheld barcode reader 300 can also have two switchable, field upgradeable lower portions so that handheld barcode reader 300 can be can be configured to have vision camera 355 or not have vision camera 355. For example, referring to FIG. 12, base portion 335 of handheld barcode reader 300 can have lower portion 350, as described above, which includes vision camera 355 (and optical sensor 380 if used) and can have a switchable, field upgradeable second lower portion 350A that is also removably attachable to upper portion 340 of base portion 335 and does not include vision camera 355 or optical sensor 380. Since second lower portion 350A does not have vision camera 355, second lower portion 350A could have an extension 390 that extends from second lower portion 350A and is configured to block base window 345 in upper portion 340. Alternatively, rather than extension 390, base window 345 could be covered or blocked by a label, a plug, a plate, etc. when second lower portion 350A is used.

Referring to FIGS. 13-16, a fourth example handheld barcode reader 400 is illustrated. Handheld barcode reader 400 generally includes a housing 405 having a head portion 410 and a base portion 435. Head portion 410 includes a front portion 432 with a front window 434 formed in front portion 432.

A vision camera 455 is positioned at least partially within head portion 410 and has a first field-of-view (FOV) 460 that is directed out of front window 434. In the example shown, vision camera 455 is configured to capture images to perform functions such as facial recognition, gesture recognition, product identification, scan avoidance, ticket switching, etc., and is not configured to capture images for decoding barcodes.

A barcode reading module 420 is positioned at least partially in head portion 410 and has a second FOV 425 that is directed through a scan window 415 in head portion 410 and can at least partially overlap first FOV 460.

A controller 475 is also positioned within housing 405 and is in communication with barcode reading module 420 and vision camera 455. Controller 475 is configured to decode process signals from barcode reading module 420 from barcodes that are read by barcode reading module 420 and to receive and process images captured by and received from vision camera 455 for processes that do not include barcode reading, as discussed above. Controller 475 is also configured to synchronize barcode reading module 420 and vision camera 455 so that vision camera 455 does not capture images when barcode reading module 420 is active. Controller 475 can synchronize barcode reading module 420 and vision camera 455 based on images captured by vision camera 455 or handheld barcode reader 400 could have an optical sensor 480 that is positioned in head portion 410, is in communication with controller 475, and has a third FOV 485 that at least partially overlaps second FOV 425 of barcode reading module 420 to determine when barcode reading module 420 is active. Controller 475 can then be configured to receive signals from optical sensor 480 indicating whether or not barcode reading module 420 is active and synchronize vision camera 455 and barcode reading module 420 (e.g., by not capturing images from vision camera 455 while barcode reading module 420 is active) based on the signals received from optical sensor 480. Alternatively, controller 475 could be configured to synchronize vision camera 455 and barcode reading module 420 to activate simultaneously so that vision camera 455 can use the same illumination as barcode reading module 420.

Figure 15:
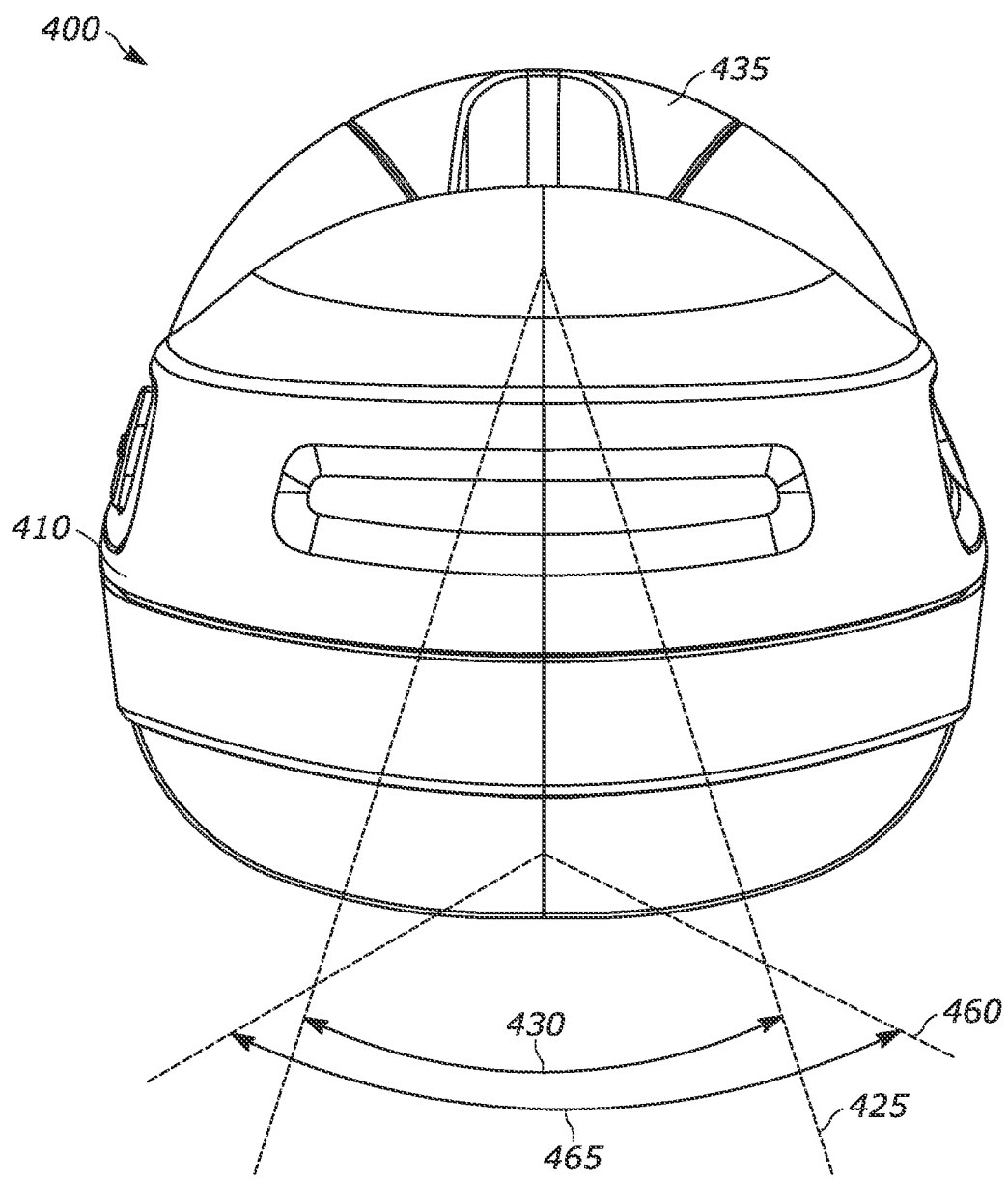
FIG. 15 illustrates a top view of the handheld barcode reader of FIG. 13.
Figure 16:
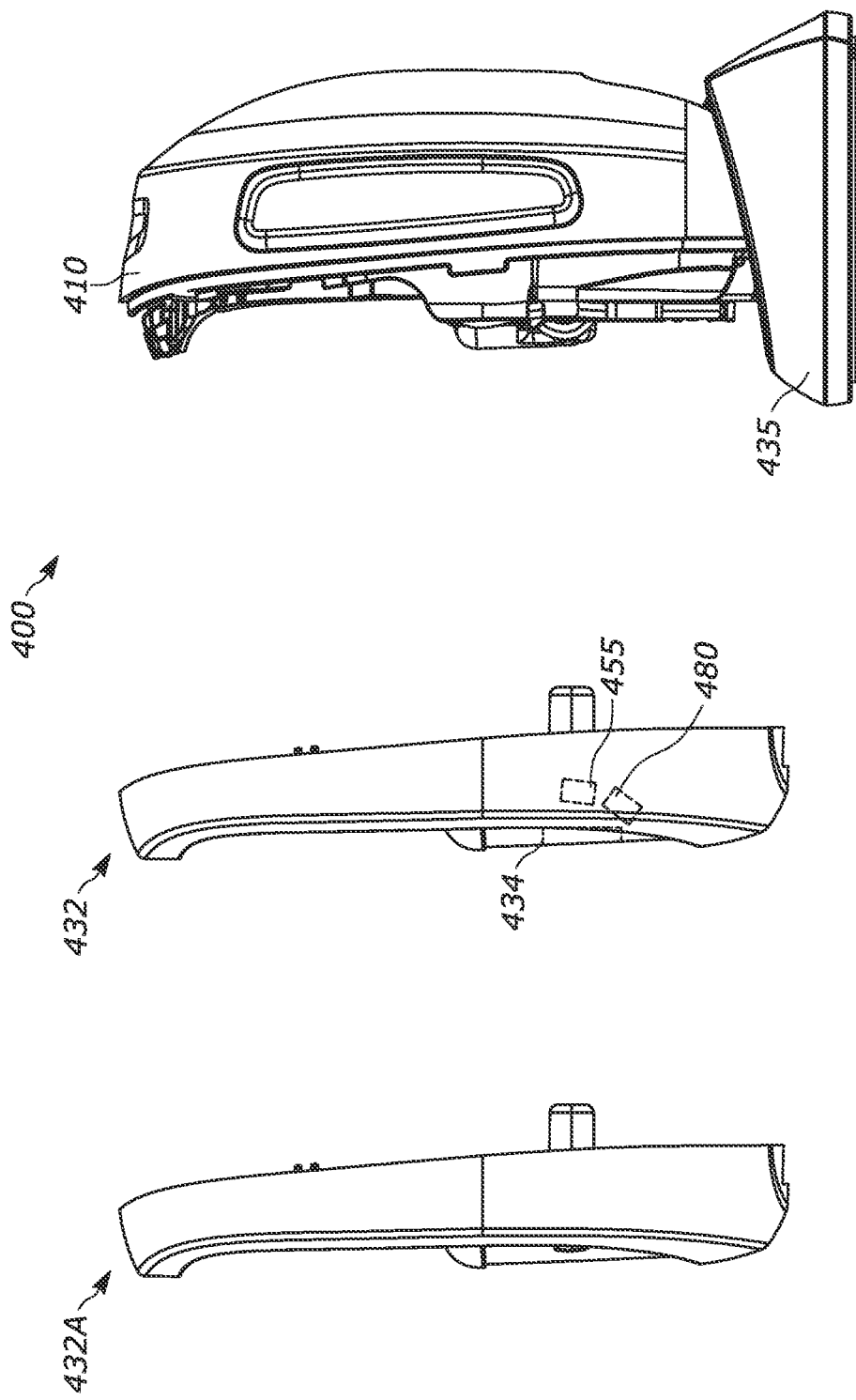
FIG. 16 illustrates a perspective view of the handheld barcode reader of FIG. 13 with two interchangeable, field-upgradable front portions.
Figure 17:
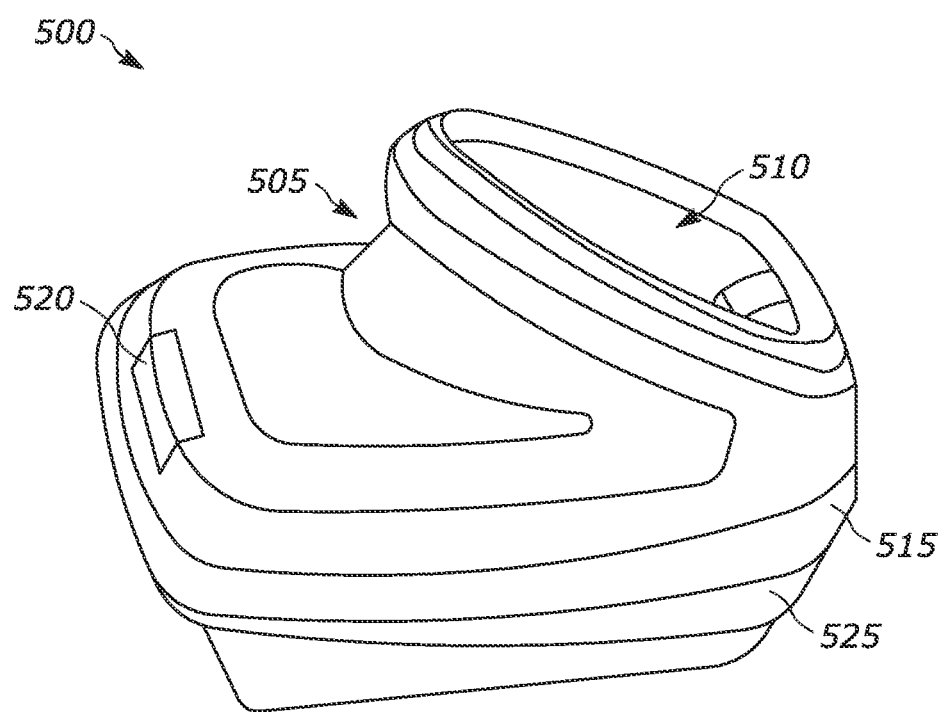
FIG. 17 illustrates a perspective view of an example base for receiving and supporting a handheld barcode reader.
Figure 18:
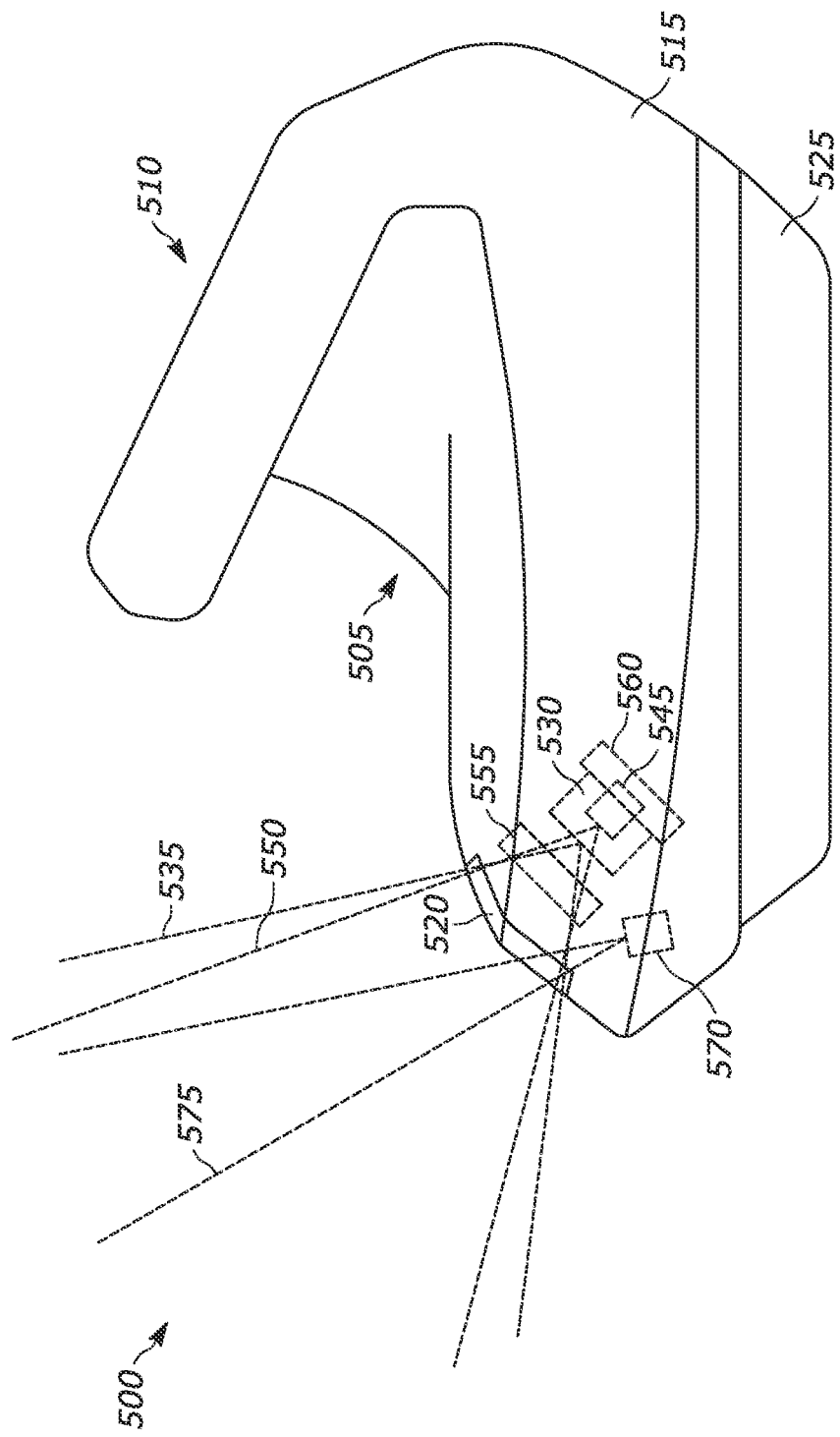
FIG. 18 illustrates a side view of the base of FIG. 17.
Figure 19:
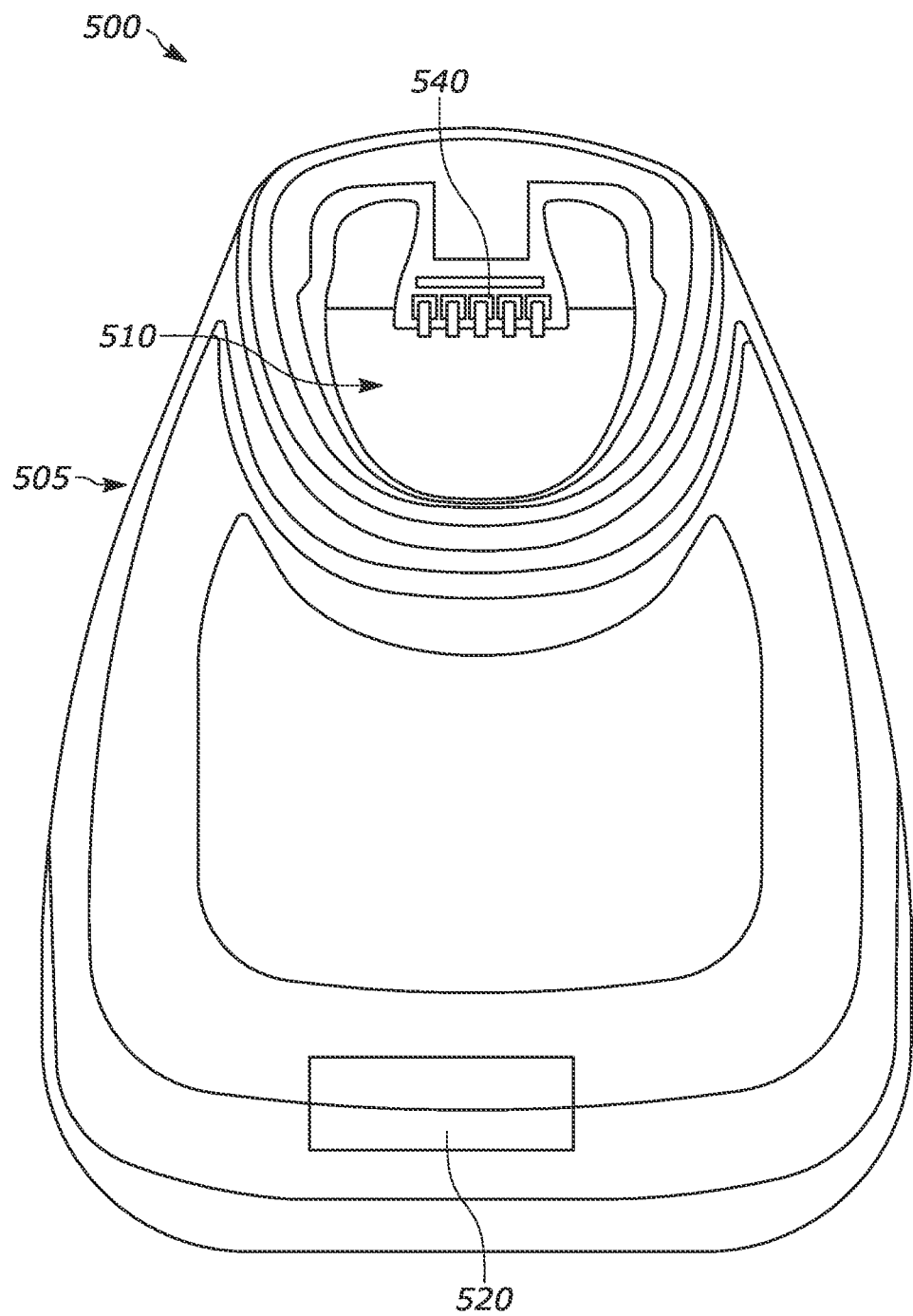
FIG. 19 illustrates a top view of the base of FIG. 18.
Figure 20:
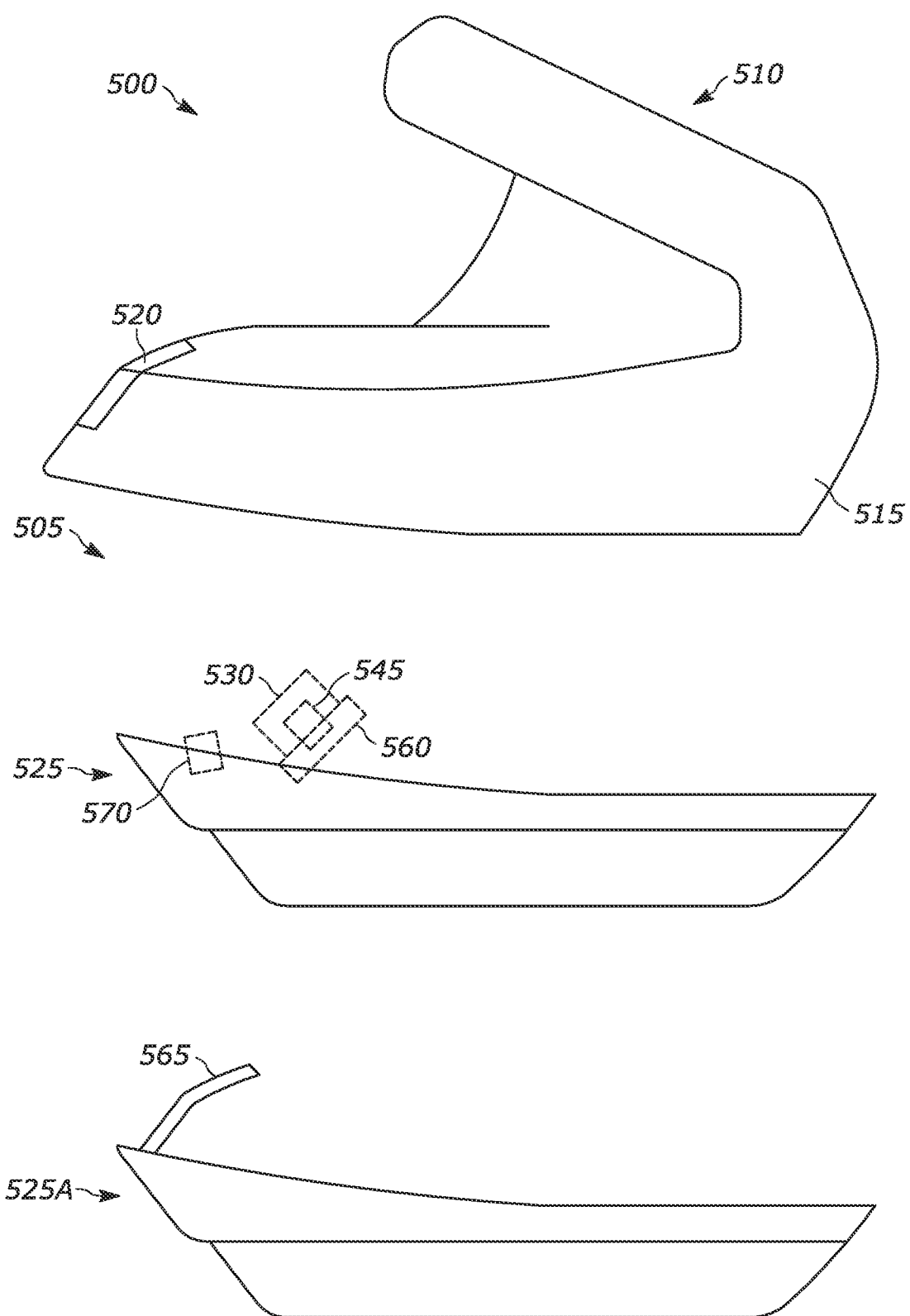
FIG. 20 illustrates a side view of the base of FIG. 18 with two interchangeable, field-upgradable lower portions.

As best shown in FIG. 15, first FOV 460 of vision camera 455 has a horizontal viewing angle 465 that is larger than the horizontal viewing angle 430 of second FOV 425 of barcode reading module 420. For example, horizontal viewing angle 465 of first FOV 460 could be between 80 degrees and 120 degrees and is preferably 100 degrees. In addition, horizontal viewing angle 430 of second FOV 425 could be between 40 degrees and 60 degrees. With horizontal viewing angle 465 of first FOV 460 of vision camera 455 being wider than horizontal viewing angle 430 of second FOV 425 of barcode reading module 420, vision camera 455 can be used as a wake-up system and controller 475 can be configured to turn on barcode reading module 420 when an object is detected in first FOV 460 of vision camera 455, before the object reaches second FOV 425 of barcode reading module 420. This allows barcode reading module 420 to be active as the object enters second FOV 425 and allows more time for barcode reading module 420 to read and decode a barcode on the object.

Handheld barcode reader 400 can also have two switchable, field upgradeable front portions so that handheld barcode reader 400 can be can be configured to have vision camera 455 or not have vision camera 455. For example, referring to FIG. 16, head portion 410 of handheld barcode reader 400 can have front portion 432, as described above, which includes vision camera 455 (and optical sensor 480 if used) and can have a switchable, field upgradeable second front portion 432A that does not include vision camera 255 or optical sensor 280. Since second front portion 432A does not have vision camera 255, second front portion 432A also does not require front window 434.

Referring to FIGS. 17-20, an example base 500 is illustrated that is configured to receive and support a handheld barcode reader. Base 500 can be a presentation cradle that supports and holds the handheld barcode reader (e.g., base 500 can hold the handheld barcode reader in an orientation that allows the handheld barcode reader to be used in a hands free application) and/or a charging base that supports, holds, and charges the handheld barcode reader. Base 500 generally includes a base housing 505 with a cradle section 510 that is configured to receive the handheld barcode reader. Base housing 505 can have an upper portion 515, which could include cradle section 510, and a lower portion 525 that is removably attached to upper portion 515. If base 500 is a charging base, base 500 can include one or more charging contacts 540 configured to contact corresponding charging contacts on the handheld barcode reader to charge the handheld barcode reader. Alternatively, rather than charging contacts 540, base 500 can include an induction charging coil or any other applicable charging means to charge the handheld barcode reader.

A vision camera 530 is positioned within base housing 505 and has a first FOV 535 that is directed through a base window 520 formed base housing 505, and specifically in upper portion 515 of base housing 505 in the example shown. In one example, vision camera 530 can be movable/rotatable within base housing 505 such that the direction that first FOV 535 is directed through base window 520 is adjustable horizontally and/or vertically. Movement/rotation of vision camera 530 can be accomplished by mounting vision camera 530 to a gimbal 560 or other device that would allow movement of vision camera 530 within base housing 505. In the example shown, vision camera 530 is configured to capture images to perform functions such as facial recognition, gesture recognition, product identification, scan avoidance, ticket switching, etc., and is not configured to capture images for decoding barcodes. Base 500 can also include an illumination source 545 positioned within base housing 505 that directs illumination 550 through base window 520 to illuminate objects within first FOV 535. A diffuser 555 can also be positioned in front of illumination source 545 to diffuse illumination 550.

Base 500 can also have two switchable, field upgradeable lower portions so that base 500 can be can be configured to have vision camera 530 or not have vision camera 530. For example, referring to FIG. 20, base housing 505 of base 500 can have lower portion 525, as described above, which includes vision camera 530 (and illumination source 545 if used) and can have a switchable, field upgradeable second lower portion 525A that is also removably attachable to upper portion 515, for example via screes, snaps, pins, toggle switches, etc., and that does not include vision camera 530 or illumination source 545. Since second lower portion 525A does not have vision camera 530, second lower portion 525A could have an extension 565 that extends from second lower portion 525A and is configured to block base window 520 in upper portion 515. Alternatively, rather than extension 565, base window 520 could be covered or blocked by a label, a plug, a plate, etc. when second lower portion 525A is used.

Figure 21:
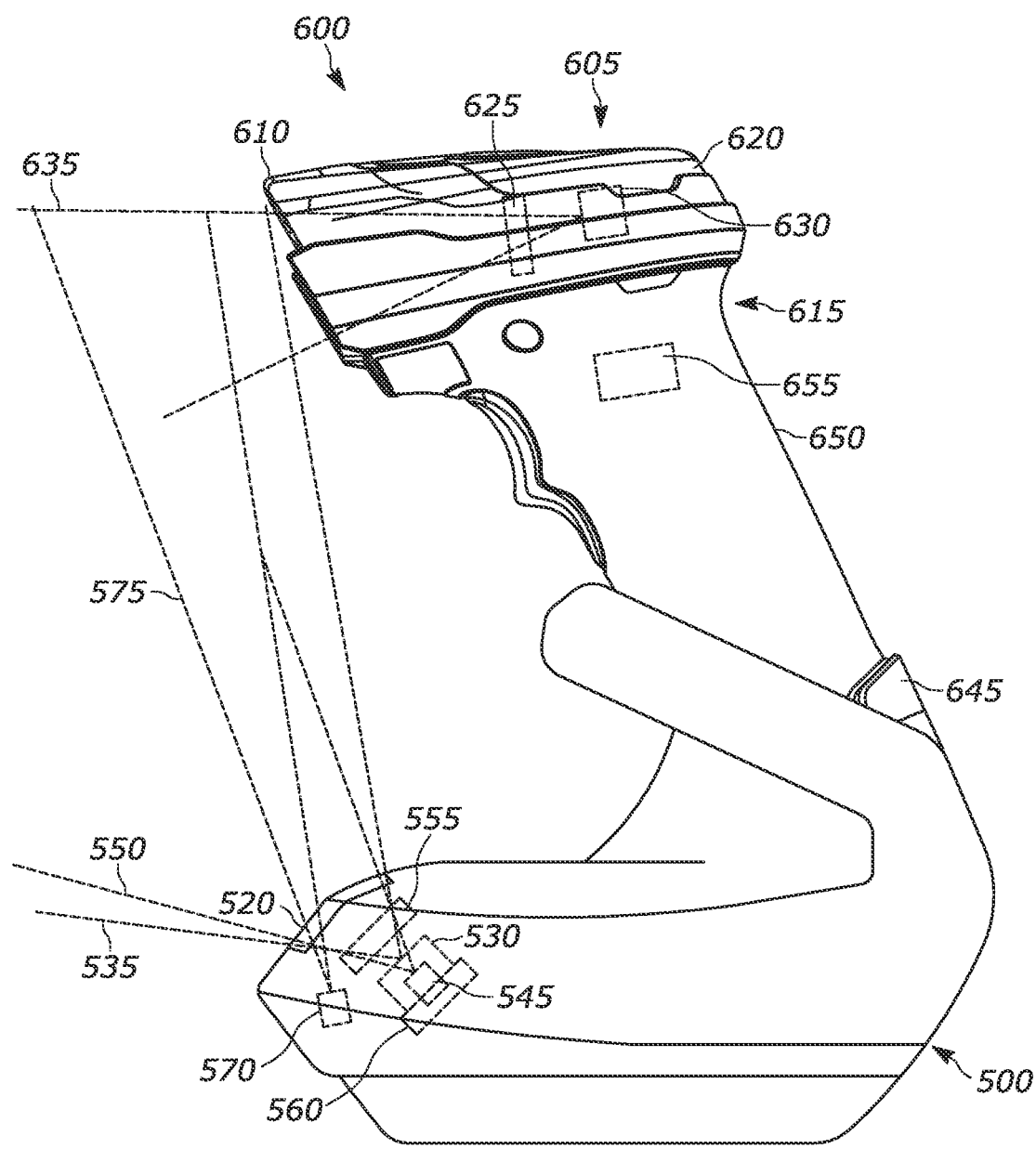
FIG. 21 illustrates a side view of a first example handheld barcode reader assembly with the base of FIGS. 17-20.

Referring to FIG. 21, a first example handheld barcode reader assembly 600 is illustrated that includes base 500, described above and illustrated in FIGS. 17-20, and a handheld barcode reader 605 positioned in base 500. Example handheld barcode reader 605 generally includes a housing 615 having a head portion 620, a base portion 645, and a handle portion 650 positioned between head portion 620 and base portion 645 and configured to be grasped by a user.

A barcode reading module 630 is positioned at least partially in head portion 620 and has a second FOV 635 that is directed through a scan window 625 in head portion 620 and can at least partially overlap first FOV 535 of vision camera 530 of base 500 when handheld barcode reader 605 is positioned in base 500.

Handheld barcode reader 605 also has a controller 655 within housing 305 that is in communication with barcode reading module 630 and with vision camera 530 of base 500, for example, through charging contacts 540 or through any other available contract, contactless, wired, or wireless means. Controller 655 is configured to decode process signals from barcode reading module 630 from barcodes that are read by barcode reading module 630 and to receive and process images captured by and received from vision camera 530 of base 500 for processes that do not include barcode reading, as discussed above. Controller 655 is also configured to synchronize barcode reading module 630 and vision camera 530 of base 500 when handheld barcode reader 605 is positioned in base 500 so that vision camera 530 does not capture images when barcode reading module 630 is active. Controller 655 can synchronize barcode reading module 630 and vision camera 530 based on images captured by vision camera 530 or base 500 could have an optical sensor 570 that is positioned in base 500, is in communication with controller 655, and has a third FOV 575 that at least partially overlaps second FOV 635 of barcode reading module 630 to determine when barcode reading module 630 is active. Controller 655 can then be configured to receive signals from optical sensor 570 indicating whether or not barcode reading module 630 is active and synchronize vision camera 530 and barcode reading module 630 (e.g., by not capturing images from vision camera 530 while barcode reading module 630 is active) based on the signals received from optical sensor 570. Alternatively, controller 655 could be configured to synchronize vision camera 530 and barcode reading module 630 to activate simultaneously so that vision camera 530 can use the same illumination as barcode reading module 630.

If base 500 is a charging base, handheld barcode reader 605 can have charging contacts, an induction coil, or another appropriate charging means that correspond to charging contacts 540, an induction coil, or another appropriate charging means in base 500 to charge handheld barcode reader 605 when it is positioned in base 500. In addition, as can be seen in FIG. 21, with handheld barcode reader 605 positioned in base 500, a front edge 610 of handheld barcode reader 605 is visible within first FOV 535 of vision camera 530 of base 500, which can provide one way for handheld barcode reader assembly 600 to determine if/when handheld barcode reader 605 is present in base 500.

Figure 22:
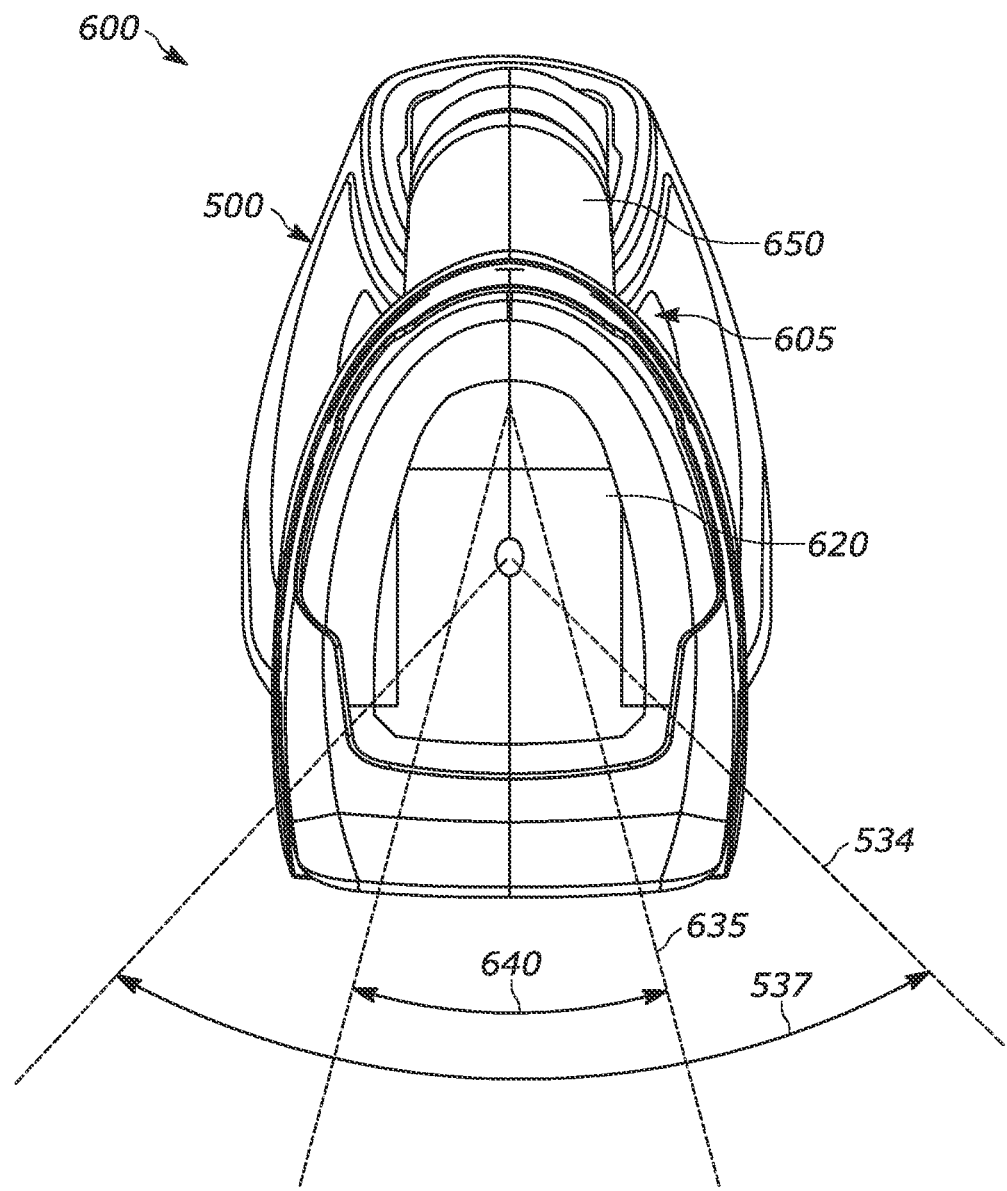
FIG. 22 illustrates a top view of the handheld barcode reader assembly of FIG. 21.

As best shown in FIG. 22, first FOV 535 of vision camera 530 of base 500 has a horizontal viewing angle 537 that is larger than the horizontal viewing angle 640 of second FOV 635 of barcode reading module 630 of handheld barcode reader 605. For example, horizontal viewing angle 537 of first FOV 535 could be between 80 degrees and 120 degrees and is preferably 100 degrees. In addition, horizontal viewing angle 640 of second FOV 635 could be between 40 degrees and 60 degrees. With horizontal viewing angle 537 of first FOV 535 of vision camera 530 being wider than horizontal viewing angle 640 of second FOV 635 of barcode reading module 630, vision camera 530 can be used as a wake-up system and controller 655 can be configured to turn on barcode reading module 630 when an object is detected in first FOV 535 of vision camera 530 and handheld barcode reader 605 is positioned in base 500, before the object reaches second FOV 635 of barcode reading module 630. This allows barcode reading module 630 to be active as the object enters second FOV 635 and allows more time for barcode reading module 630 to read and decode a barcode on the object when handheld barcode reader 605 is positioned in base 500 and operating in a hands free mode of operation.

In addition, base 500 of handheld barcode reader assembly 600 can also have two switchable, field upgradeable lower portions so that base 500 can be can be configured to have vision camera 530 or not have vision camera 530, as described above.

Figure 23:
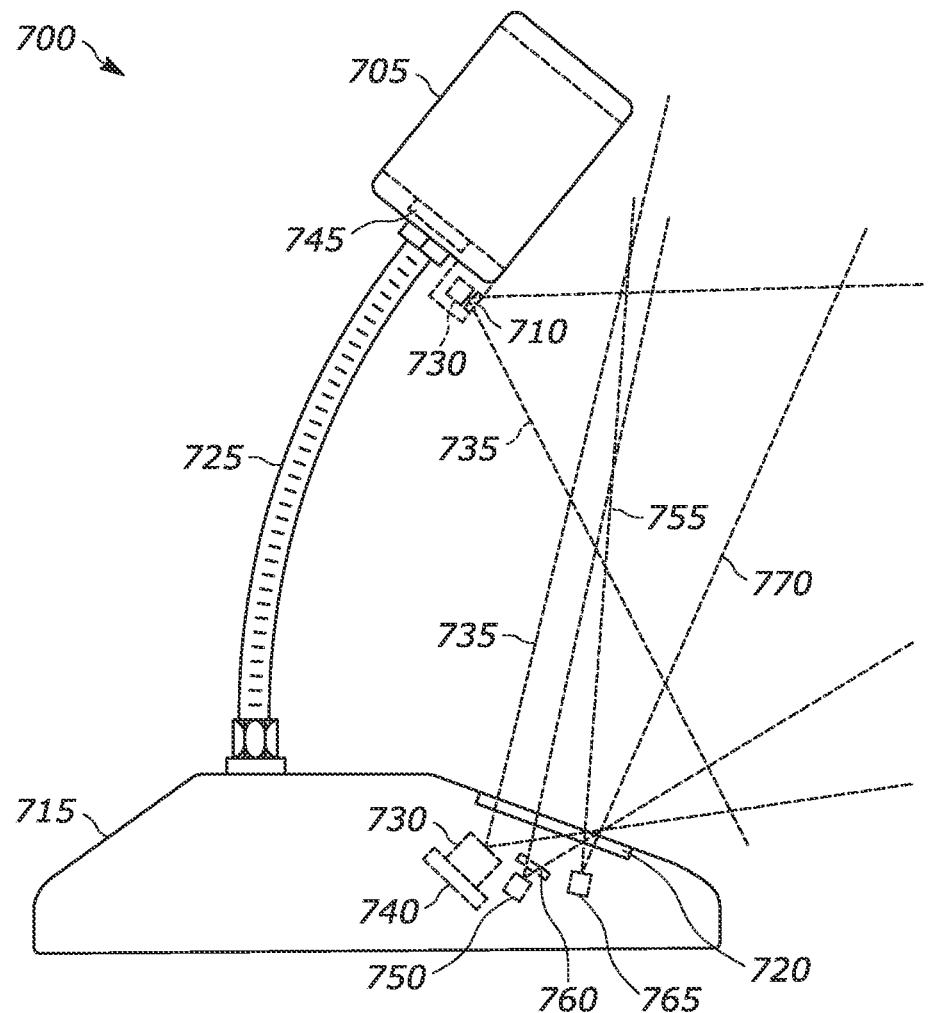
FIG. 23 illustrates a side view of an example cradle to receive and support a handheld barcode reader.

Referring to FIG. 23, an example cradle 700 is illustrated that is configured to receive and support a handheld barcode reader. Cradle 700 can be a presentation cradle that supports and holds the handheld barcode reader (e.g., cradle 700 can hold the handheld barcode reader in an orientation that allows the handheld barcode reader to be used in a hands free application) and/or a charging cradle that supports, holds, and charges the handheld barcode reader. Cradle 700 generally includes a cradle portion 705 that is configured to receive and hold the handheld barcode reader, a base portion 715, and an arm 725, or other support structure, connecting cradle portion 705 to base portion 715. In the example shown, arm 725 is an adjustable gooseneck arm, but could be any type of adjustable or non-adjustable arm or other support structure to interconnect cradle portion 705 and base portion 715. If cradle 700 is a charging cradle, cradle 700 can include one or more charging elements 745, such as charging contacts configured to contact corresponding charging contacts on the handheld barcode reader, an induction charging coil corresponding to an induction charging coil in the handheld barcode reader, etc., to charge the handheld barcode reader.

A vision camera 730 is preferably positioned in base portion 715 and has a first FOV 735 that is directed through a base window 720 formed base portion 715. Alternatively, as shown in phantom in FIG. 23, vision camera 730 could be positioned in cradle portion 705 and first FOV 735 could be directed through a cradle window 710 in cradle portion 705. If desired, separate vision cameras 730 could be positioned with one in base portion 715 and one in cradle portion 705 to provide substantially different angles of view of an object, which can be helpful in identifying ticket switching and for product identification. In one example, vision camera 730 can be movable/rotatable within base portion 715 such that the direction that first FOV 735 is directed through base window 720 is adjustable horizontally and/or vertically. Movement/rotation of vision camera 730 can be accomplished by mounting vision camera 730 to a gimbal 740 or other device that would allow movement of vision camera 730 within base portion 715. In the example shown, vision camera 730 is configured to capture images to perform functions such as facial recognition, gesture recognition, product identification, scan avoidance, ticket switching, etc., and is not configured to capture images for decoding barcodes. Cradle 700 can also include an illumination source 750 positioned within base portion 715 that directs illumination 755 through base window 720 to illuminate objects within first FOV 735. A diffuser 760 can also be positioned in front of illumination source 750 to diffuse illumination 755.

Figure 24:
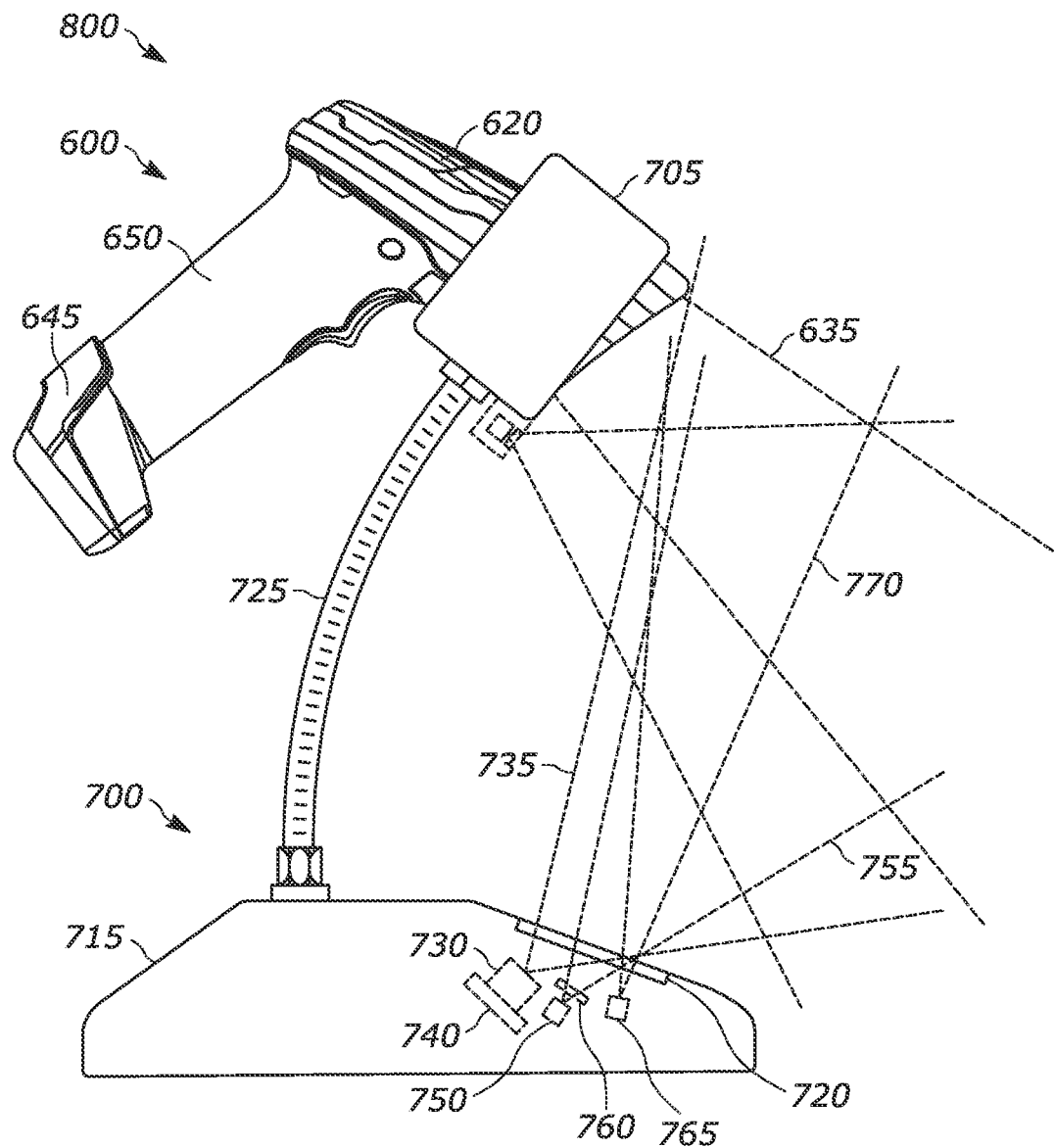
FIG. 24 illustrates side view of a second example handheld barcode reader assembly with the cradle of FIG. 23.

Referring to FIG. 24, a second example handheld barcode reader assembly 800 is illustrated that includes cradle 700, described above and illustrated in FIGS. 17-20, and handheld barcode reader 605, described above, positioned in base 500. Second FOV 635 of barcode reading module 630 of handheld barcode reader 605 can at least partially overlap first FOV 735 of vision camera 730 of cradle 700 when handheld barcode reader 605 is positioned in cradle 700.

Controller 655 of handheld barcode reader 605 is in communication with barcode reading module 630 and with vision camera 730 of cradle 700, for example, through charging element 745 or through any other available contract, contactless, wired, or wireless means. Controller 655 is configured to decode process signals from barcode reading module 630 from barcodes that are read by barcode reading module 630 and to receive and process images captured by and received from vision camera 730 of cradle 700 for processes that do not include barcode reading, as discussed above. Controller 655 is also configured to synchronize barcode reading module 630 and vision camera 730 of cradle 700 when handheld barcode reader 605 is positioned in cradle 700 so that vision camera 730 does not capture images when barcode reading module 630 is active. Controller 655 can synchronize barcode reading module 630 and vision camera 730 based on images captured by vision camera 730 or cradle 700 could have an optical sensor 765 that is positioned in cradle 700, is in communication with controller 655, and has a third FOV 770 that at least partially overlaps second FOV 635 of barcode reading module 630 to determine when barcode reading module 630 is active. Controller 655 can then be configured to receive signals from optical sensor 765 indicating whether or not barcode reading module 630 is active and synchronize vision camera 730 and barcode reading module 630 (e.g., by not capturing images from vision camera 730 while barcode reading module 630 is active) based on the signals received from optical sensor 765. Alternatively, controller 655 could be configured to synchronize vision camera 730 and barcode reading module 630 to activate simultaneously so that vision camera 730 can use the same illumination as barcode reading module 630.

In addition, as can be seen in FIG. 24, with handheld barcode reader 605 positioned in cradle 700, front edge 610 of handheld barcode reader 605 is visible within first FOV 735 of vision camera 730 of cradle 700, which can provide one way for handheld barcode reader assembly 800 to determine if/when handheld barcode reader 605 is present in cradle 700.

Figure 25:
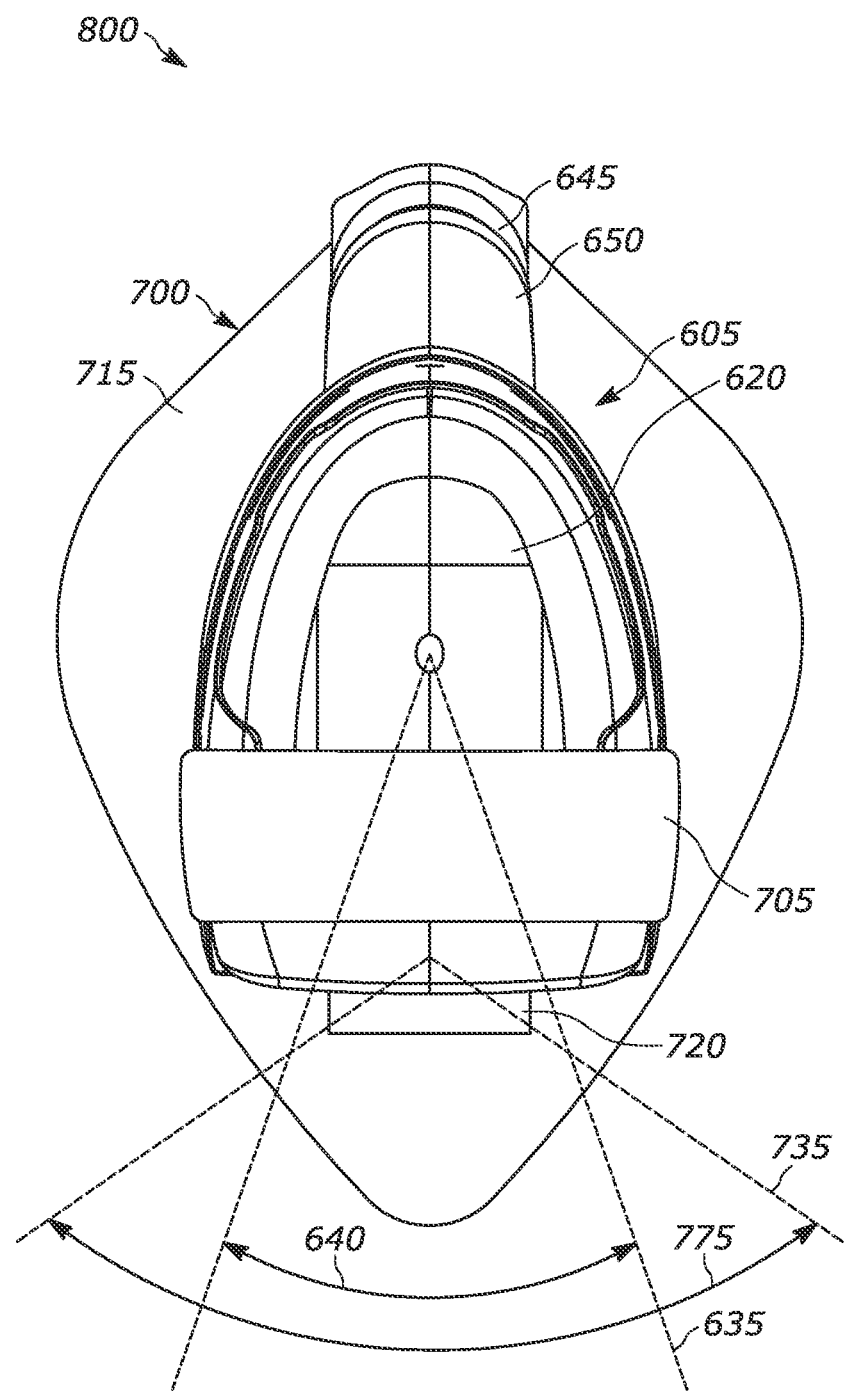
FIG. 25 illustrates a top view of the handheld barcode reader assembly of FIG. 24.

As best shown in FIG. 25, first FOV 735 of vision camera 730 of cradle 700 has a horizontal viewing angle 775 that is larger than the horizontal viewing angle 640 of second FOV 635 of barcode reading module 630 of handheld barcode reader 605. For example, horizontal viewing angle 775 of first FOV 735 could be between 80 degrees and 120 degrees and is preferably 100 degrees. In addition, horizontal viewing angle 640 of second FOV 635 could be between 40 degrees and 60 degrees. With horizontal viewing angle 775 of first FOV 735 of vision camera 730 being wider than horizontal viewing angle 640 of second FOV 635 of barcode reading module 630, vision camera 730 can be used as a wake-up system and controller 655 can be configured to turn on barcode reading module 630 when an object is detected in first FOV 735 of vision camera 730 and handheld barcode reader 605 is positioned in cradle 700, before the object reaches second FOV 635 of barcode reading module 630. This allows barcode reading module 630 to be active as the object enters second FOV 635 and allows more time for barcode reading module 630 to read and decode a barcode on the object when handheld barcode reader 605 is positioned in cradle 700 and operating in a hands free mode of operation.

Figure 26:
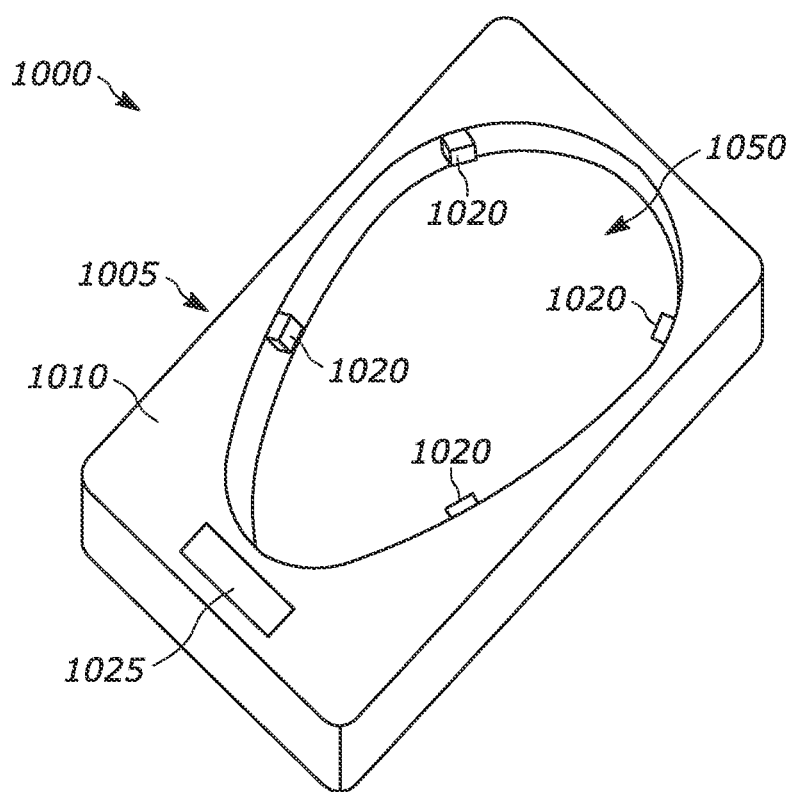
FIG. 26 illustrates a perspective view of an example adapter for use with a handheld barcode reader or a base for a handheld barcode reader.
Figure 27:
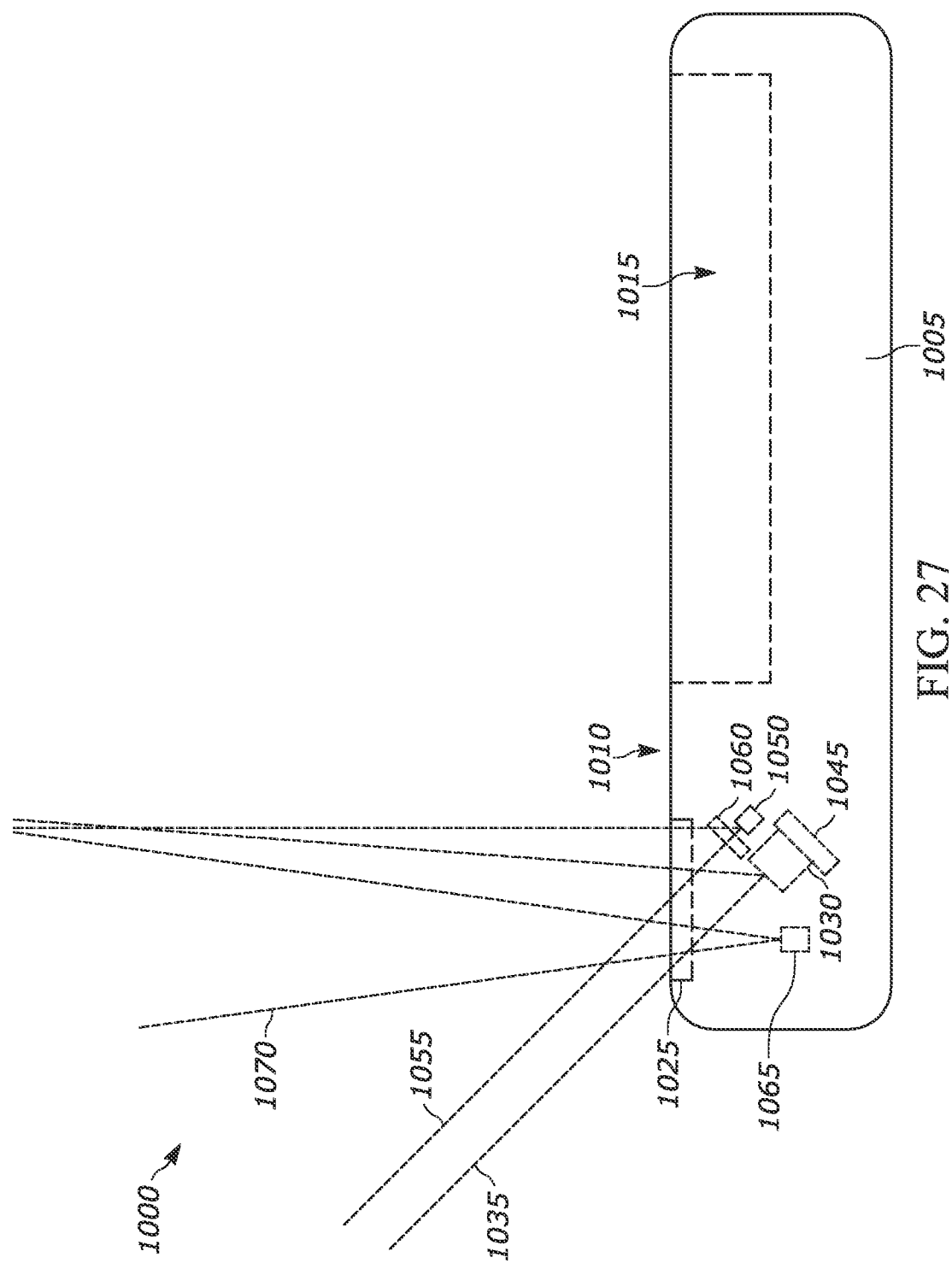
FIG. 27 illustrates a side view of the adapter of FIG. 26.

Rather than integrating a vision camera directly into the handheld barcode reader or a base for a handheld barcode reader, the vision camera can also be integrated into an adapter that can be attached to a handheld barcode reader (e.g., to a base portion or a head portion of the handheld barcode reader) or to a base for a handheld barcode reader. This would allow the handheld barcode reader, base, or handheld barcode reader assembly to be sold with and without the vision camera while keeping the no camera configuration free of the extra cost and height of the camera version. Referring to FIGS. 26-27, an example adapter 1000 is illustrated that can be configured to be attached to a handheld barcode reader (e.g., to a base portion or a head portion of the handheld barcode reader) or to be attached to a base that is configured to receive and support a handheld barcode reader. Adapter 1000 generally includes an adapter housing 1005 and a means for attaching the adapter housing to a base portion of a housing of the handheld barcode reader or to the base for the handheld barcode reader. The handheld barcode reader or the base for the handheld barcode reader could be attached to an upper surface 1010 of adapter housing 1005, for example with screws, snaps, hooks, adhesive, magnets, etc., or, as shown in FIGS. 26 and 27, adapter housing 1005 can include a cavity 1015 that is configured to receive the base portion of the handheld barcode reader or the base for the handheld barcode reader, which can be retained in cavity 1015 by tabs 1020 or any other appropriate attachment means, such as screws, snaps, a friction fit, hooks, adhesive, dowel pins, magnets, etc.

A vision camera 1030 is positioned within adapter housing 1005 and has a first FOV 1035 that is directed through a base window 1025 formed adapter housing 1005. Preferably, an area adjacent a front of handle portion 1145 (e.g., within 10 mm of the front of handle portion 1145 or within a finger's width of the front of handle portion 1145) is visible in first FOV 1035, which can be used to determine if a user is gripping handle portion and possibly switch handheld barcode reader 1105 between a hands-free presentation mode and a handheld scanning mode based on vision camera 1030 detecting the presence or absence of the hand of the user within first FOV 1035. In one example, vision camera 1030 can be movable/rotatable within adapter housing 1005 such that the direction that first FOV 1035 is directed through base window 1025 is adjustable horizontally and/or vertically. Movement/rotation of vision camera 1030 can be accomplished by mounting vision camera 1030 to a gimbal 1045 or other device that would allow movement of vision camera 1030 within adapter housing 1005. In the example shown, vision camera 1030 is configured to capture images to perform functions such as facial recognition, gesture recognition, product identification, scan avoidance, ticket switching, etc., and is not configured to capture images for decoding barcodes. Adapter 1000 can also include an illumination source 1050 positioned within adapter housing 1005 that directs illumination 1055 through base window 1025 to illuminate objects within first FOV 1035. A diffuser 1060 can also be positioned in front of illumination source 1050 to diffuse illumination 1055.

Figure 28:
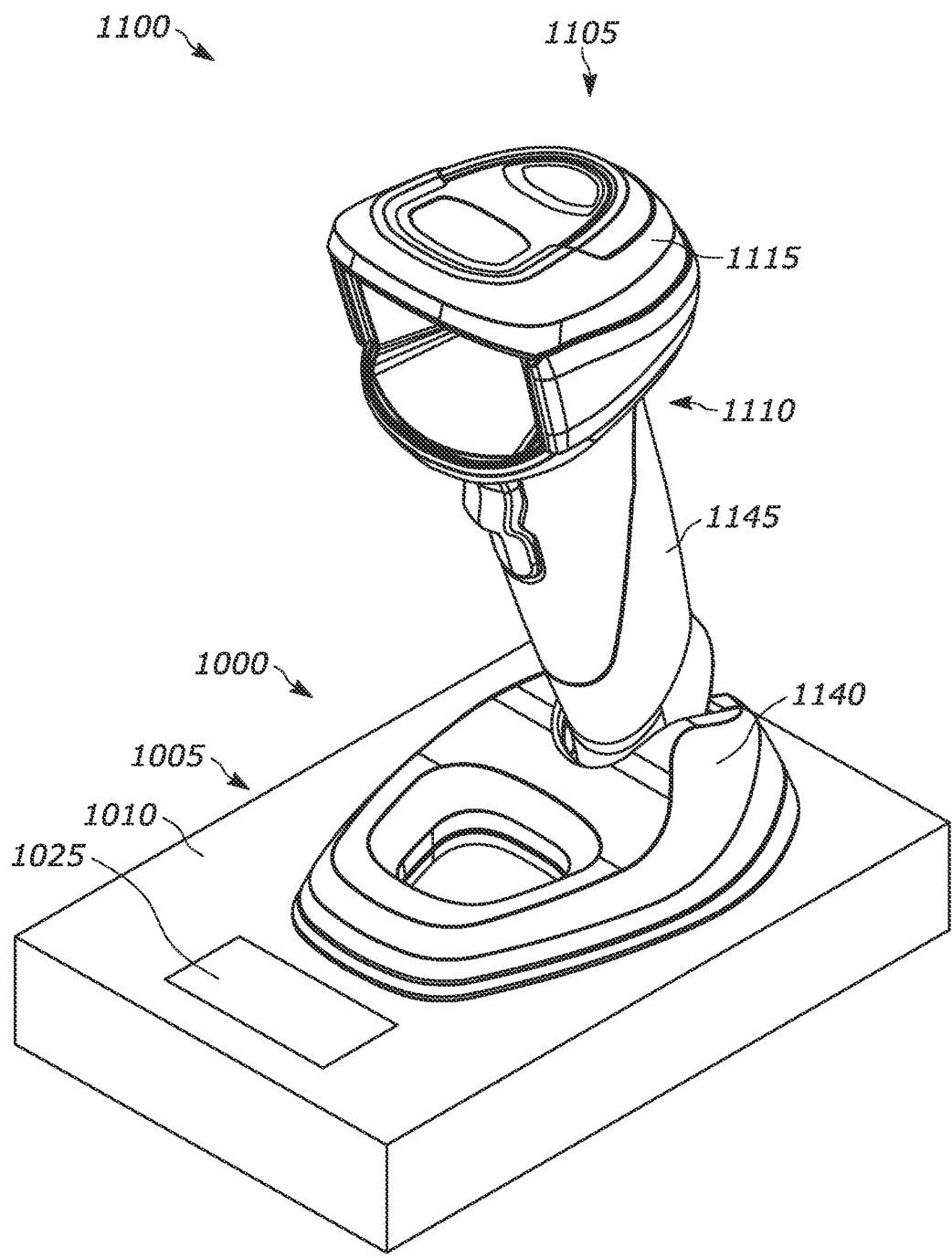
FIG. 28 illustrates a perspective view of a third example handheld barcode reader assembly with the adapter of FIGS. 26-27.
Figure 29:
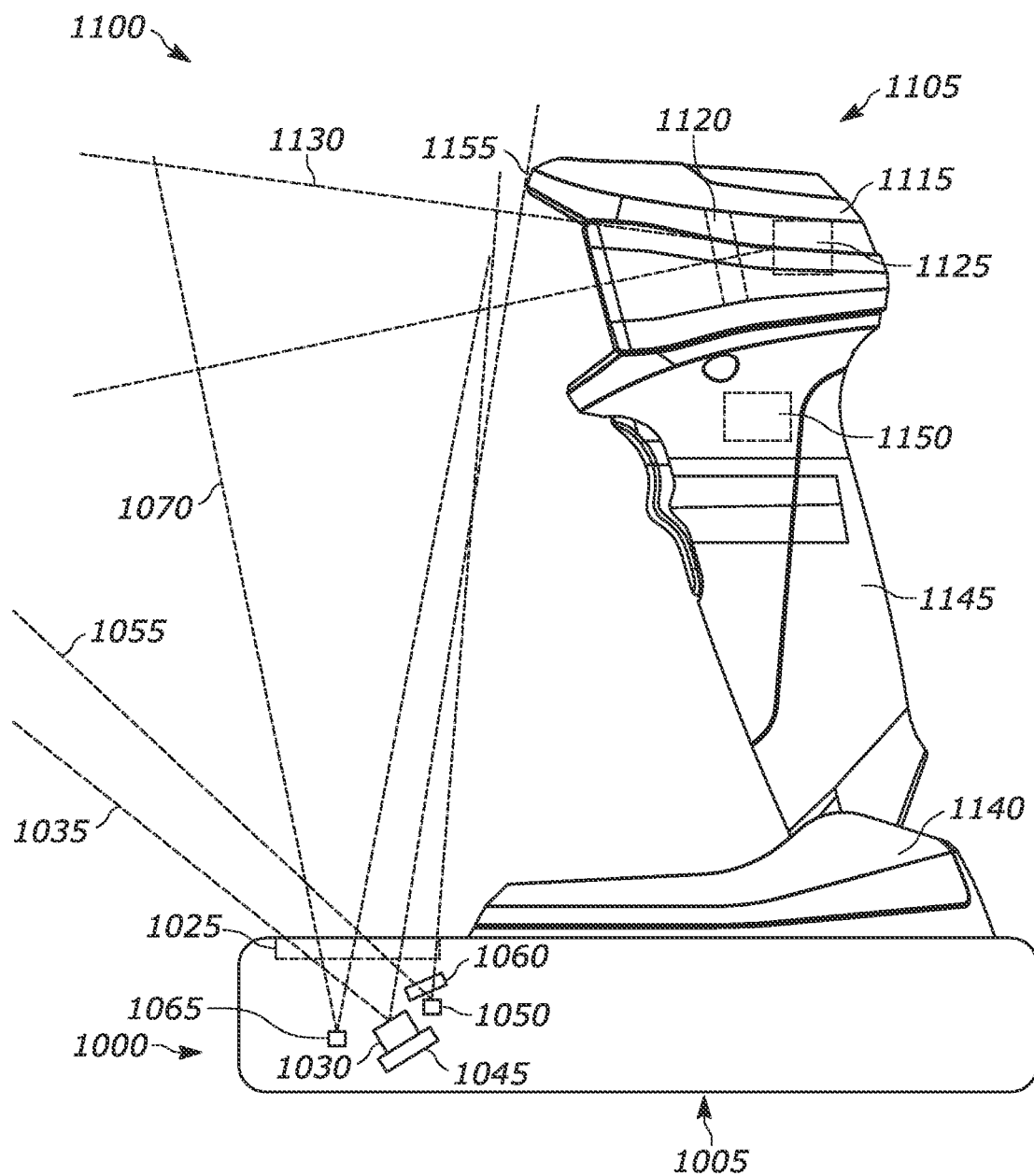
FIG. 29 illustrates a side view of the handheld barcode reader assembly of FIG. 28.
Figure 30:
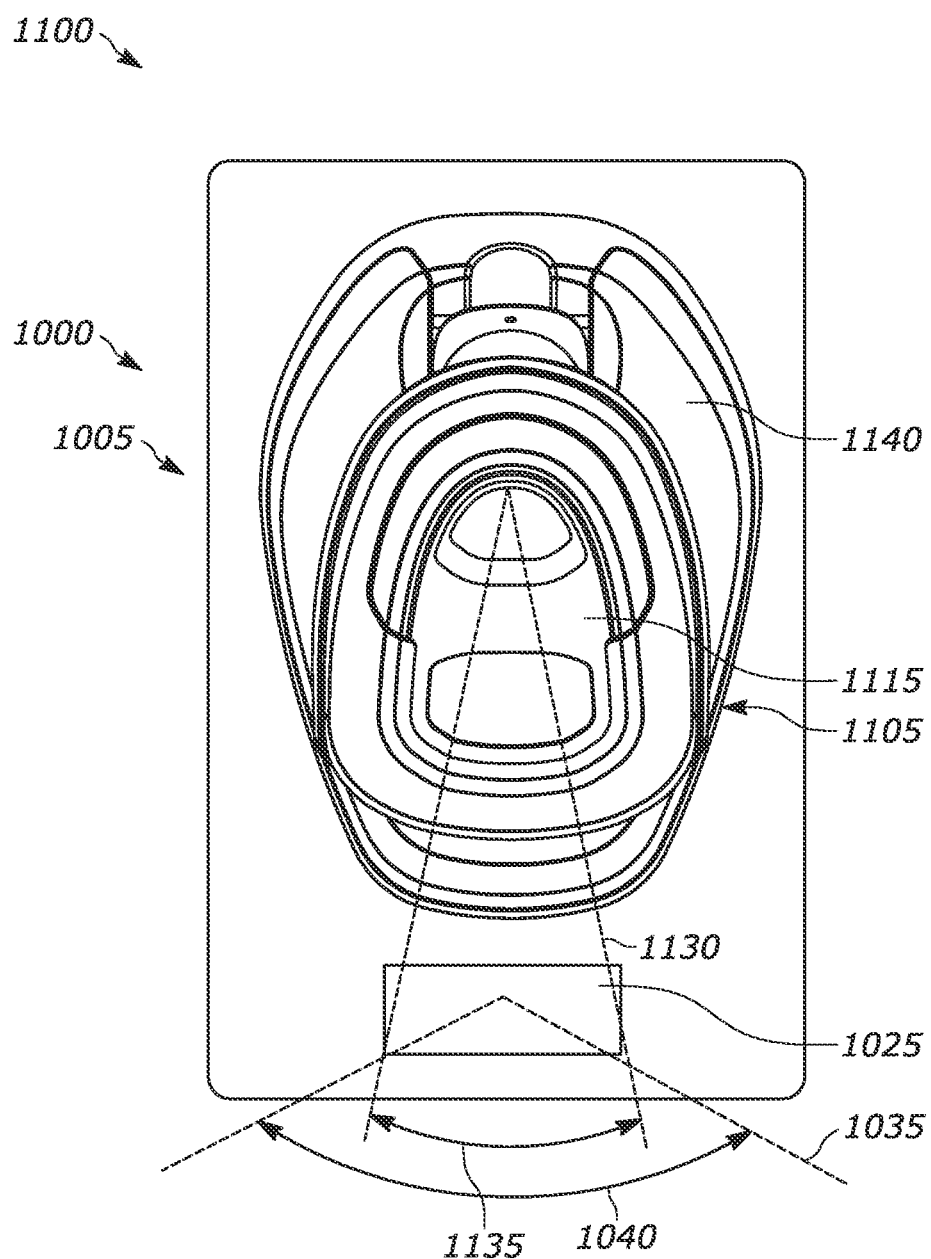
FIG. 30 illustrates a top view of the handheld barcode reader assembly of FIG. 28.

Referring to FIGS. 28-30, a third example handheld barcode reader assembly 1100 is illustrated that includes adapter 1000, described above and illustrated in FIGS. 26-27, and a handheld barcode reader 1105 attached to adapter 1000. Example handheld barcode reader 1105 generally includes a housing 1110 having a head portion 1115, a base portion 1140, and a handle portion 1145 positioned between head portion 1115 and base portion 1140 and configured to be grasped by a user. Rather than handheld barcode reader 1105, barcode reader assembly 1100 could alternatively have other styles of handheld barcode readers, such slot scanners, such as handheld barcode reader 200 described above.

Handheld barcode reader 1105 also has a barcode reading module 1125 positioned at least partially in head portion 1115 and barcode reading module 1125 has a second FOV 1130 that is directed through a scan window 1120 in head portion 1115, which can at least partially overlap first FOV 1035 of vision camera 1030 of adapter 1000 when handheld barcode reader 1105 is attached to adapter 1000. Handheld barcode reader 1105 also has a controller 1150 within housing 1110 that is in communication with barcode reading module 1125 and with vision camera 1030 of adapter 1000 with adapter 1000 attached to handheld barcode reader 1105, for example, through any appropriate contact, contactless, wired, or wireless means. Controller 1150 is configured to decode process signals from barcode reading module 1125 from barcodes that are read by barcode reading module 1125 and to receive and process images captured by and received from vision camera 1030 of adapter 1000 for processes that do not include barcode reading, as discussed above. Controller 1150 is also configured to synchronize barcode reading module 1125 and vision camera 1030 of adapter 1000 when handheld barcode reader 1105 is attached to adapter 1000 so that vision camera 1030 does not capture images when barcode reading module 1125 is active and adapter 1000 is attached to handheld barcode reader 1105. Controller 1150 can synchronize barcode reading module 1125 and vision camera 1030 based on images captured by vision camera 1030 or adapter 1000 could have an optical sensor 1065 that is positioned in adapter housing 1005, is in communication with controller 1150, and has a third FOV 1070 that at least partially overlaps second FOV 1130 of barcode reading module 1125 to determine when barcode reading module 1125 is active. Controller 1150 can then be configured to receive signals from optical sensor 1065 indicating whether or not barcode reading module 1125 is active and synchronize vision camera 1030 and barcode reading module 1125 (e.g., by not capturing images from vision camera 1030 while barcode reading module 1125 is active) based on the signals received from optical sensor 1065. Alternatively, controller 1150 could be configured to synchronize vision camera 1030 and barcode reading module 1125 to activate simultaneously so that vision camera 1030 can use the same illumination as barcode reading module 1125.

In addition, as can be seen in FIG. 29, with handheld barcode reader 1105 attached to adapter 1000, a front edge 1155 of handheld barcode reader 1105 is visible within first FOV 1035 of vision camera 1030 of adapter 1000, which can provide one way for handheld barcode reader assembly 1100 to determine if/when handheld barcode reader 1105 is attached to adapter 1000.

As best shown in FIG. 30, first FOV 1035 of vision camera 1030 of adapter 1000 has a horizontal viewing angle 1040 that is larger than the horizontal viewing angle 1135 of second FOV 1130 of barcode reading module 1125 of handheld barcode reader 1105. For example, horizontal viewing angle 1040 of first FOV 1035 could be between 80 degrees and 120 degrees and is preferably 100 degrees. In addition, horizontal viewing angle 1135 of second FOV 1130 could be between 40 degrees and 60 degrees. With horizontal viewing angle 1040 of first FOV 1035 of vision camera 1030 being wider than horizontal viewing angle 1135 of second FOV 1130 of barcode reading module 1125, vision camera 1030 can be used as a wake-up system and controller 1150 can be configured to turn on barcode reading module 1125 when an object is detected in first FOV 1035 of vision camera 1030 and handheld barcode reader 1105 is attached to adapter 1000, before the object reaches second FOV 1130 of barcode reading module 1125. This allows barcode reading module 1125 to be active as the object enters second FOV 1130 and allows more time for barcode reading module 1125 to read and decode a barcode on the object when handheld barcode reader 1105 is attached to adapter 1000.

Figure 31:
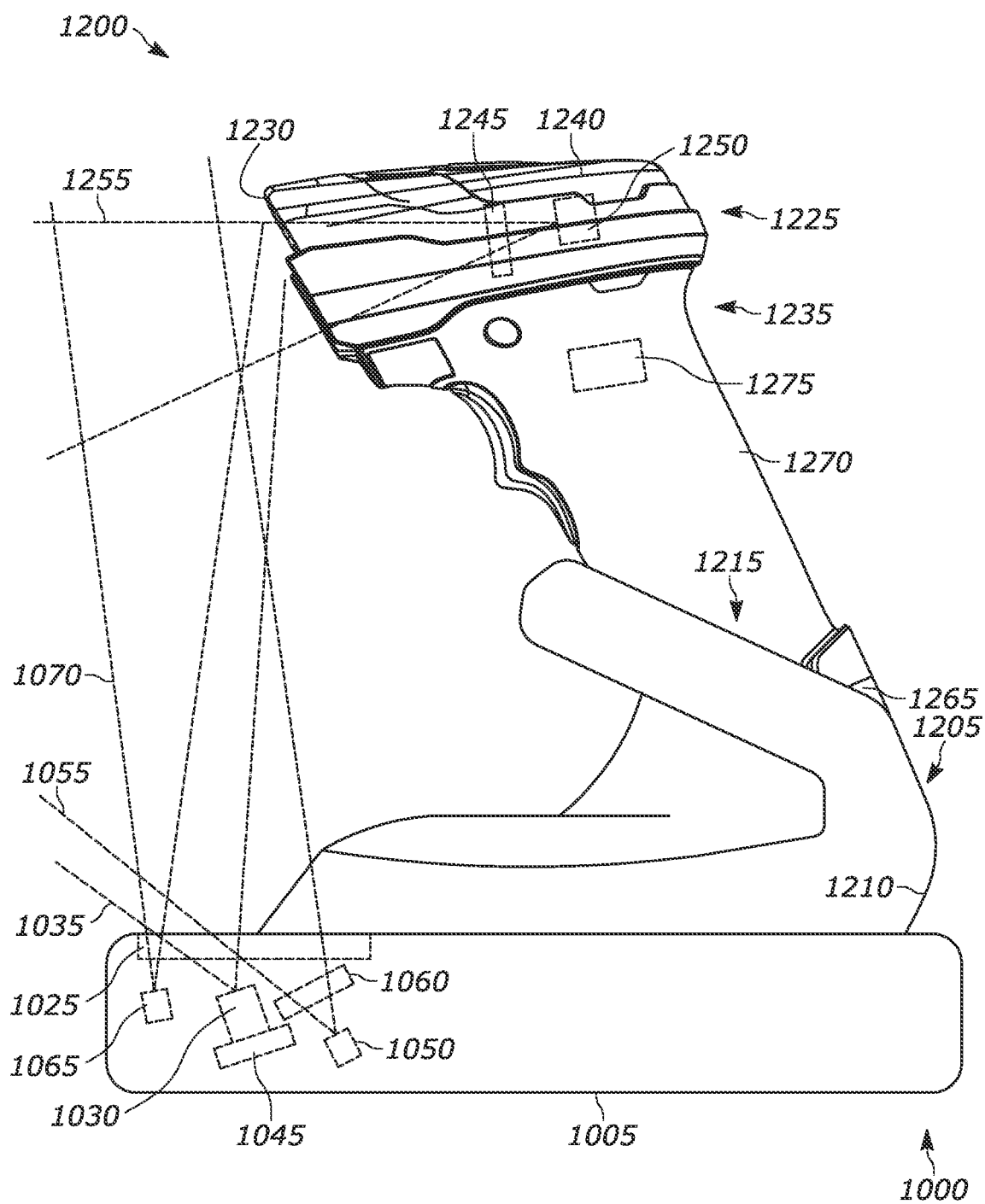
FIG. 31 illustrates a side view of a fourth example handheld barcode reader assembly with the adapter of FIGS. 26-27.
Figure 32:
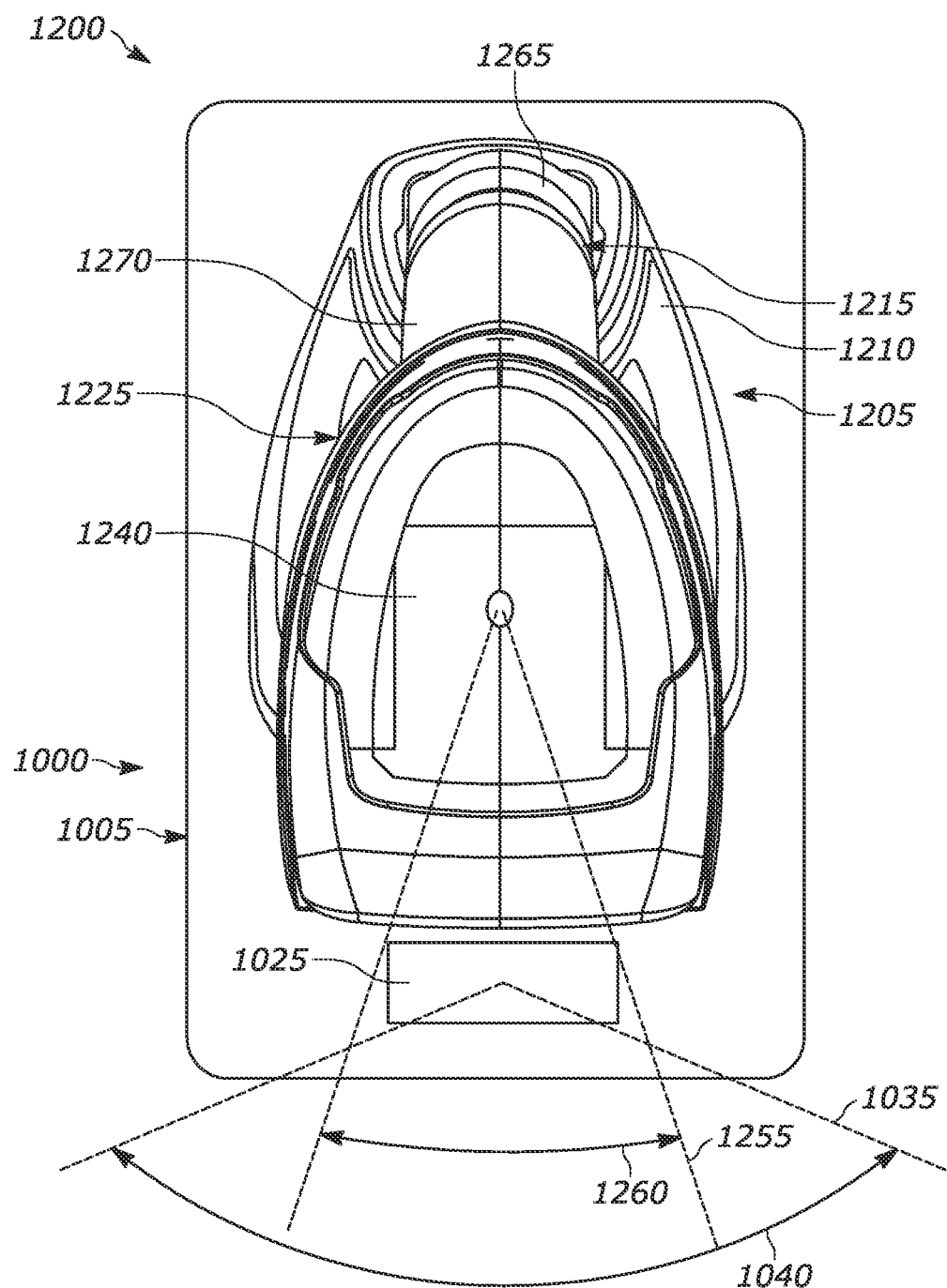
FIG. 32 illustrates a top view of the handheld barcode reader assembly of FIG. 31.

Referring to FIGS. 31-32, a fourth example handheld barcode reader assembly 1200 is illustrated that includes adapter 1000, described above and illustrated in FIGS. 26-27, a base 1205 attached to adapter 1000, and a handheld barcode reader 1225 received within and supported by base 1205. Example base 1205 generally includes a base housing 1210 having a cradle section 1215 to receive and support handheld barcode reader 1225. Example handheld barcode reader 1225 generally includes a housing 1235 having a head portion 1240, a base portion 1265, and a handle portion 1270 positioned between head portion 1240 and base portion 1265 and configured to be grasped by a user.

Handheld barcode reader 1225 also has a barcode reading module 1250 positioned at least partially in head portion 1240 and barcode reading module 1250 has a second FOV 1255 that is directed through a scan window 1245 in head portion 1240, which can at least partially overlap first FOV 1035 of vision camera 1030 of adapter 1000 when base 1205 is attached to adapter 1000 and handheld barcode reader 1105 is positioned in base 1205. Handheld barcode reader 1225 also has a controller 1275 within housing 1235 that is in communication with barcode reading module 1250 and with vision camera 1030 of adapter 1000 with adapter 1000 attached to base 1205, for example, through any appropriate contact, contactless, wired, or wireless means. Controller 1275 is configured to decode process signals from barcode reading module 1250 from barcodes that are read by barcode reading module 1250 and to receive and process images captured by and received from vision camera 1030 of adapter 1000 for processes that do not include barcode reading, as discussed above. Controller 1275 is also configured to synchronize barcode reading module 1250 and vision camera 1030 of adapter 1000 when base 1205 is attached to adapter 1000 and handheld barcode reader 1225 is positioned in base 1205 so that vision camera 1030 does not capture images when barcode reading module 1250 is active and adapter 1000 is attached to base 1205. Controller 1275 can synchronize barcode reading module 1250 and vision camera 1030 based on images captured by vision camera 1030 or adapter 1000 could have an optical sensor 1065 that is positioned in adapter housing 1005, is in communication with controller 1275, and has a third FOV 1070 that at least partially overlaps second FOV 1255 of barcode reading module 1250 to determine when barcode reading module 1250 is active. Controller 1275 can then be configured to receive signals from optical sensor 1065 indicating whether or not barcode reading module 1250 is active and synchronize vision camera 1030 and barcode reading module 1250 (e.g., by not capturing images from vision camera 1030 while barcode reading module 1250 is active) based on the signals received from optical sensor 1065. Alternatively, controller 1275 could be configured to synchronize vision camera 1030 and barcode reading module 1250 to activate simultaneously so that vision camera 1030 can use the same illumination as barcode reading module 1250.

In addition, as can be seen in FIG. 31, with base 1205 attached to adapter 1000 and handheld barcode reader 1225 positioned in base 1205, a front edge 1230 of handheld barcode reader 1225 is visible within first FOV 1035 of vision camera 1030 of adapter 1000, which can provide one way for handheld barcode reader assembly 1200 to determine if/when base 1205 is attached to adapter 1000 and handheld barcode reader 1225 is positioned in base 1205.

As best shown in FIG. 32, first FOV 1035 of vision camera 1030 of adapter 1000 has a horizontal viewing angle 1040 that is larger than the horizontal viewing angle 1260 of second FOV 1255 of barcode reading module 1250 of handheld barcode reader 1225. For example, horizontal viewing angle 1040 of first FOV 1035 could be between 80 degrees and 120 degrees and is preferably 100 degrees. In addition, horizontal viewing angle 1260 of second FOV 1255 could be between 40 degrees and 60 degrees. With horizontal viewing angle 1040 of first FOV 1035 of vision camera 1030 being wider than horizontal viewing angle 1260 of second FOV 1255 of barcode reading module 1250, vision camera 1030 can be used as a wake-up system and controller 1275 can be configured to turn on barcode reading module 1250 when an object is detected in first FOV 1035 of vision camera 1030, base 1205 is attached to adapter 1000, and handheld barcode reader 1225 is positioned in base 1205, before the object reaches second FOV 1255 of barcode reading module 1250. This allows barcode reading module 1250 to be active as the object enters second FOV 1255 and allows more time for barcode reading module 1250 to read and decode a barcode on the object when base 1205 is attached to adapter 1000 and handheld barcode reader 1225 is positioned in base 1205.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A handheld barcode reader, comprising:
 a housing defining a head portion and a base portion;
 a vision camera positioned in the base portion, the vision camera having a first field-of-view (FOV) directed through a base window in the base portion; and
 a barcode reading module positioned at least partially in the head portion, the barcode reading module having a second FOV directed through a scan window in the head portion; and a controller in communication with the barcode reading module and the vision camera, the controller configured to decode barcodes read by the barcode reading module, receive captured images from the vision camera, and synchronize the barcode reading module and the vision camera such that the vision camera does not capture images when the barcode reading module is active.

2. The handheld barcode reader of claim 1, wherein the controller is configured to process signals from the barcode reading module to decode barcodes and to process images from the vision camera for processes that do not include barcode reading.

3. The handheld barcode reader of claim 1, wherein the housing defines a handle portion between the head portion and the base portion.

4. The handheld barcode reader of claim 3, wherein an area adjacent the handle portion is visible within the first FOV.

5. The handheld barcode reader of claim 1, wherein: the base portion comprises an upper portion and a lower portion removably attached to the upper portion; and the base window is in the upper portion.

6. The handheld barcode reader of claim 1, wherein the first FOV at least partially overlaps the second FOV.

7. The handheld barcode reader of claim 6, wherein the first FOV has a horizontal viewing angle between 80 degrees and 120 degrees.

8. The handheld barcode reader of claim 7, wherein the horizontal viewing angle is 100 degrees.

9. The handheld barcode reader of claim 8, wherein the second FOV has a horizontal viewing angle between 40 degrees and 60 degrees and the controller is configured to turn on the barcode reading module when an object is detected in the first FOV.

10. The handheld barcode reader of claim 1, comprising: an optical sensor positioned in the base portion and in communication with the controller, the optical sensor having a third FOV that at least partially overlaps the second FOV; wherein the controller receives signals from the optical sensor and synchronizes the barcode reading module and the vision camera based on the signals from the optical sensor.

11. The handheld barcode reader of claim 1, wherein:
the base portion comprises an upper portion and two switchable, field upgradable lower portions removably attachable to the upper portion;
a first lower portion of the two switchable, field upgradable lower portions includes the vision camera; and
a second lower portion of the two switchable, field upgradable lower portions does not include the vision camera.

12. The handheld barcode reader of claim 11, wherein the housing defines a handle portion between the head portion and the base portion.

13. The handheld barcode reader of claim 12, wherein an area adjacent the handle portion is visible within the first FOV.

14. The handheld barcode reader of claim 11, wherein the second lower portion comprises an extension configured to block the base window.

15. The handheld barcode reader of claim 11, wherein the first FOV at least partially overlaps the second FOV.

16. The handheld barcode reader of claim 15, wherein the first FOV has a horizontal viewing angle between 80 degrees and 120 degrees.

17. The handheld barcode reader of claim 16, wherein the horizontal viewing angle is 100 degrees.

18. The handheld barcode reader of claim 17, comprising a controller in communication with the barcode reading module and the vision camera and configured to decode barcodes read by the barcode reading module and to receive captured images from the vision camera, wherein the second FOV has a horizontal viewing angle between 40 degrees and 60 degrees and the controller is configured to turn on the barcode reading module when an object is detected in the first FOV.

19. The handheld barcode reader of claim 11, comprising a controller in communication with the barcode reading module and the vision camera and configured to decode barcodes read by the barcode reading module, receive captured images from the vision camera, and synchronize the barcode reading module and the vision camera such that the vision camera does not capture images when the barcode reading module is active.

20. The handheld barcode reader of claim 19, wherein: the first lower portion comprises an optical sensor in communication with the controller, the optical sensor having an third FOV that at least partially overlaps the second FOV; and the controller receives signals from the optical sensor and synchronizes the barcode reading module and the vision camera based on the signals from the optical sensor.

* * * * *